US008522160B2

(12) United States Patent
Imanishi

(10) Patent No.: US 8,522,160 B2
(45) Date of Patent: Aug. 27, 2013

(54) INFORMATION PROCESSING DEVICE, CONTENTS PROCESSING METHOD AND PROGRAM

(75) Inventor: Masayuki Imanishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 645 days.

(21) Appl. No.: 12/707,978

(22) Filed: Feb. 18, 2010

(65) Prior Publication Data
US 2010/0251173 A1    Sep. 30, 2010

(30) Foreign Application Priority Data

Mar. 26, 2009   (JP) ................................ 2009-076970

(51) Int. Cl.
G06F 3/048     (2006.01)
G06F 17/00    (2006.01)
A63F 13/00    (2006.01)

(52) U.S. Cl.
USPC .............................. 715/810; 715/781; 463/35

(58) Field of Classification Search
USPC .......................................... 715/781; 463/35
See application file for complete search history.

(56) References Cited

U.S. PATENT DOCUMENTS

| | | | | |
|---|---|---|---|---|
| 5,926,179 | A * | 7/1999 | Matsuda et al. | 715/752 |
| 6,057,856 | A * | 5/2000 | Miyashita et al. | 345/633 |
| 6,784,901 | B1 * | 8/2004 | Harvey et al. | 715/757 |
| 7,106,360 | B1 * | 9/2006 | Frederick | 348/157 |
| 7,492,915 | B2 * | 2/2009 | Jahnke | 381/119 |
| 2001/0026284 | A1 * | 10/2001 | Yamamoto et al. | 345/619 |
| 2005/0026695 | A1 * | 2/2005 | Tsuchiyama et al. | 463/42 |
| 2006/0025216 | A1 * | 2/2006 | Smith | 463/35 |
| 2006/0273984 | A1 * | 12/2006 | Wanda et al. | 345/7 |
| 2007/0168359 | A1 * | 7/2007 | Jacob et al. | 707/10 |
| 2007/0188712 | A1 * | 8/2007 | Kutner | 353/15 |
| 2008/0071399 | A1 * | 3/2008 | Baird | 700/94 |
| 2008/0192116 | A1 * | 8/2008 | Tamir et al. | 348/157 |
| 2008/0214273 | A1 * | 9/2008 | Snoddy et al. | 463/19 |
| 2008/0318687 | A1 * | 12/2008 | Backer et al. | 463/42 |
| 2009/0271821 | A1 * | 10/2009 | Zalewski | 725/37 |
| 2009/0298587 | A1 * | 12/2009 | Acharya et al. | 463/35 |

FOREIGN PATENT DOCUMENTS

| | | |
|---|---|---|
| JP | 2003-333572 | 11/2003 |
| JP | 2007-134808 | 5/2007 |

OTHER PUBLICATIONS

Steve DiPaola and David Collins. 2003. A social metaphor-based 3D virtual environment. In ACM SIGGRAPH 2003 Educators Program (SIGGRAPH '03). ACM, New York, NY, USA, 1-5.*

* cited by examiner

Primary Examiner — William Bashore
Assistant Examiner — Andrea Long
(74) Attorney, Agent, or Firm — Oblon, Spivak, McClelland, Maier & Neustadt, L.L.P.

(57) ABSTRACT

There is provided an information processing device including, a screen control unit that causes a user terminal to display a position selection screen displaying a plurality of user positions where a user can be located in a virtual space and allowing a user to select one user position from the plurality of user positions, a data storage unit that stores a user list listing users having selected each user position with respect to each user position selected by using the position selection screen; and a contents processing unit that processes contents to be delivered to the user terminal according to a positional relationship between users represented by the user list stored in the data storage unit.

13 Claims, 21 Drawing Sheets

FIG.4

| USER ID | STATUS | FRIEND USER |
|---------|--------|-------------|
| U11 | LOGIN | U13 |
| U12 | LOGIN | U15, U16 |
| U13 | LOGOUT | U11 |
| : | : | : |

| USER POSITION ID | OPPOSITE POSITION | USER LIST | | |
|---|---|---|---|---|
| 14A | 14C | U11 | U13 | |
| 14B | 14E | U12 | U14 | |
| 14C | 14A | | | |
| : | : | : | : | : |

| USER POSITION | DISTANCE | WEIGHT |
|---|---|---|
| DIFFERENT | 0.8 | 0.2 |
| SAME | 0.1×N | 1-0.1×N |

N=1 WHEN ADJACENT IN USER LIST

FIG.13

| USER POSITION ID | OPPOSITE POSITION | SEAT ID | USER LIST | | | 131 |
|---|---|---|---|---|---|---|
| 14A | 14C | SA01 | U11 | | | |
| | | SA02 | U13 | | | |
| | | .. | | | | |
| 14B | 14E | SB01 | U12 | U14 | | |
| | | SB02 | U17 | | | |
| | | .. | | | | |
| .. | .. | .. | .. | .. | | |

FIG.15

| USER POSITION | SEAT | DISTANCE | WEIGHT |
|---|---|---|---|
| DIFFERENT |  | 0.8 | 0.2 |
| SAME | DIFFERENT | 0.1×M | 1-0.1×M |
| SAME | SAME | 0.0 | 1.0 |

M=1 WHEN SEATS ARE ADJACENT IN USER LIST

FIG.17
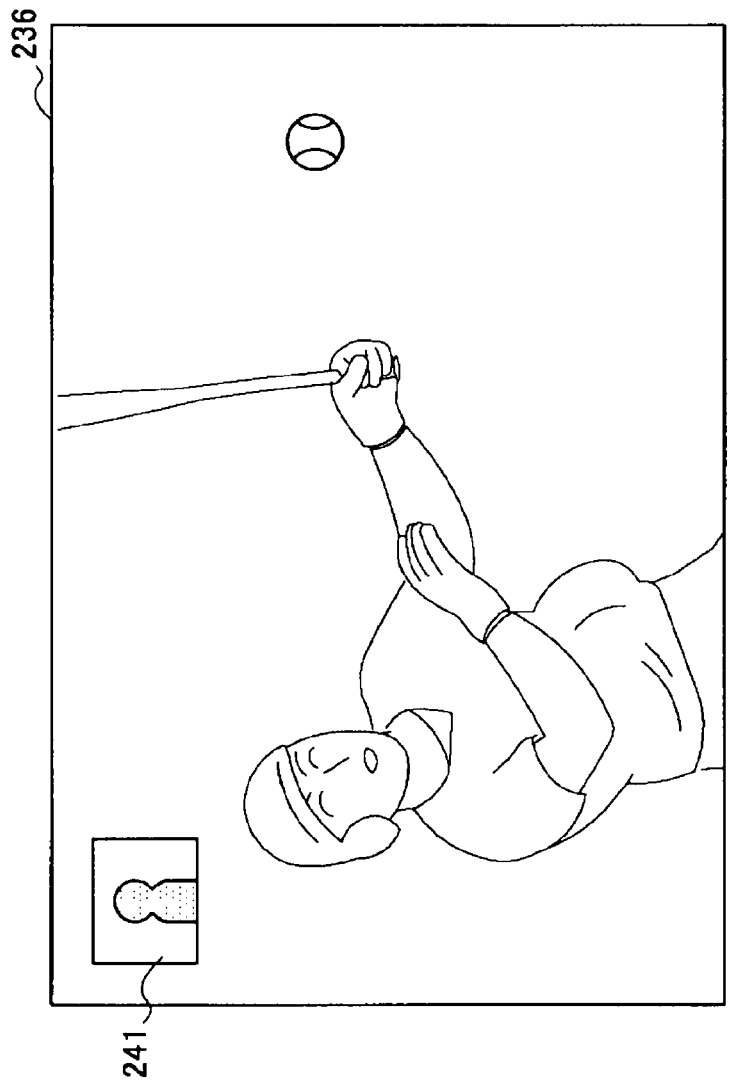
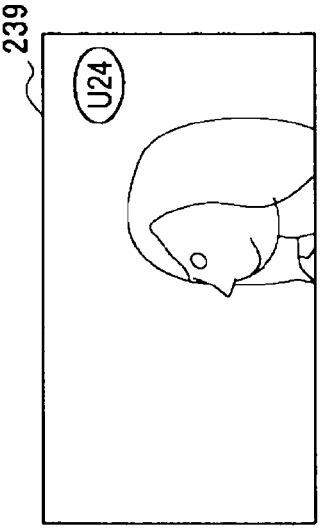
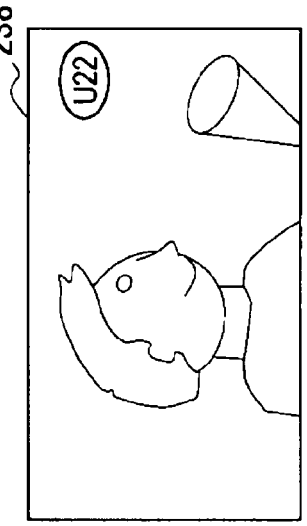

INFORMATION PROCESSING DEVICE, CONTENTS PROCESSING METHOD AND PROGRAM

BACKGROUND OF THE INVENTION

1. Field of the Invention

The present invention relates to an information processing device, a contents processing method and a program.

2. Description of the Related Art

Recently, large-volume contents such as high-quality moving images or sound can be delivered through a network such as the Internet. Examples of moving image contents delivered through a network are video of a sports match such as baseball or soccer game, video of a music live performance by a musician and so on. Such contents can be generally delivered from a contents server that has acquired contents data to a plurality of user terminals, which are clients, via a network. In this case, a plurality of users shares the contents that are delivered from the contents server. However, if the contents are delivered to a plurality of user terminals individually, reality which a user can experience when actually watching (or viewing) a sports match, a music live performance or the like is diminished, for example.

In view of this, a technique for improving reality when sharing contents among a plurality of users has been developed. For example, Japanese Unexamined Patent Publication No. 2003-333572 discloses a virtual audience creation device capable of synthesizing video and sound as if a number of audiences got together in a studio and were participating one television program. Further, Japanese Unexamined Patent Publication No. 2007-134808 discloses a sound delivery device capable of converting sound according to the viewing conditions of contents among user terminals and providing a user with the sound of other users with whom the contents are shared.

SUMMARY OF THE INVENTION

However, in the technique disclosed in Japanese Unexamined Patent Publication No. 2003-333572, what kind of video and sound are to be synthesized depends only on the operation of the virtual audience creation device which corresponds to a contents server, and therefore a user can only enjoy the provided video and sound in an inactive manner. Further, in the technique disclosed in Japanese Unexamined Patent Publication No. 2007-134808, although the sound of other users which are selected by a user is reproduced in a user terminal, the position of a user in space or the like is not taken into consideration, and it is difficult to attain sufficient reality.

Specifically, in a sports match, a music live performance or the like, for example, a user goes through visually and acoustically different experiences depending on where the user is located in real space. For example, in the case of watching a sports match, greater impression or excitement can be achieved when users who cheer for the same team or player get together in a particular place. Further, the presence of real space is not necessarily the precondition for such a point. Specifically, with regard also to a user who enjoys a video game in a virtual reality world, for example, the experience of the user often differs depending on where the user is located in the world. Therefore, in the case of delivering contents through a network also, it is expected that reality experienced by a user will be enhanced by processing the contents according to the position of the user in a virtual space that imitates the real space or in a space in virtual reality.

In light of the foregoing, it is desirable to provide a novel and improved information processing device, contents processing method and program that enable improvement of reality experienced by a user by processing contents according to a position in a virtual space selected by the user.

According to an embodiment of the present invention, there is provided an information processing device including, a screen control unit that causes a user terminal to display a position selection screen displaying a plurality of user positions where a user can be located in a virtual space and allowing a user to select one user position from the plurality of user positions, a data storage unit that stores a user list listing users having selected each user position with respect to each user position selected by using the position selection screen and a contents processing unit that processes contents to be delivered to the user terminal according to a positional relationship between users represented by the user list stored in the data storage unit.

In this configuration, if a user selects any one user position in the virtual space by using the position selection screen, a selection result of the user position is acquired by the screen control unit and reflected on the user list stored in the data storage unit. Then, the contents to be delivered to the user terminal is processed by the contents processing unit according to the positional relationship between users in the user list. Each user can thereby watch or view the contents processed according to the positional relationship in the virtual space which is selected by the user.

The contents processing unit may process contents to be delivered to the user terminal according to a predetermined distance in a virtual space with regard to the positional relationship between users.

The positional relationship between users may include a positional relationship between different user positions and a positional relationship between users in one user position in the user list.

The contents processing unit may superimpose contents supplied from a user terminal of another user on contents to be delivered to a user terminal of one user by using weight determined according to the distance in the virtual space.

A value of the weight may be larger as the distance in the virtual space is closer.

The information processing device may further including a contents delivery unit that delivers first contents commonly delivered to a plurality of user terminals and second contents supplied from a user terminal of a second user located in the same user position as a first user to a user terminal of the first user.

The second user may be a user adjacent to the first user in the user list.

The contents processing unit may superimpose third contents supplied from a user terminal of a third user located in a different user position from the user position of the first user on the first contents.

The position selection screen may be a screen further displaying a list of users located in each user position and allowing a user to select one user position from the plurality of user positions by selecting any one of the displayed users.

The data storage unit may arrange a user selected on the position selection screen and a user who has selected the user adjacent to each other in the user list.

The contents processing unit may superimpose contents supplied from a user terminal of a friend user associated in advance with one user on contents to be delivered to a user terminal of the user.

According to another embodiment of the present invention, there is provided a contents processing method, using an information processing device that stores a user list listing users having selected each user position with respect to each of a plurality of user positions where a user can be located in a virtual space in a recording medium, the method including the steps of displaying a position selection screen allowing a user to select one user position from the plurality of user positions on a user terminal, updating the user list according to a selection result of a user position acquired through the position selection screen, and processing contents to be delivered to the user terminal according to a positional relationship between users represented by the user list.

According to another embodiment of the present invention, there is provided a program causing a computer controlling an information processing device to implement functions including a screen control unit that causes a user terminal to display a position selection screen displaying a plurality of user positions where a user can be located in a virtual space and allowing a user to select one user position from the plurality of user positions, a data storage unit that stores a user list listing users having selected each user position with respect to each user position selected by using the position selection screen, and a contents processing unit that processes contents to be delivered to the user terminal according to a positional relationship between users represented by the user list stored in the data storage unit.

According to the embodiments of the present invention described above, it is possible to provide an information processing device, a contents processing method and a program that enables improvement of reality experienced by a user.

BRIEF DESCRIPTION OF THE DRAWINGS

FIG. 4 is an explanatory view showing an example of user data according to the first embodiment.

FIG. 5 is an explanatory view showing an example of user position data according to the first embodiment.

FIG. 8 is an explanatory view showing an example of weight used for synthesis of contents.

FIG. 13 is an explanatory view showing an example of user position data according to an alternative example.

FIG. 15 is an explanatory view showing another example of weight used for synthesis of contents.

FIG. 17 is an explanatory view to describe contents delivered to a user terminal in the second embodiment.

DETAILED DESCRIPTION OF THE EMBODIMENT(S)

Figure 1:
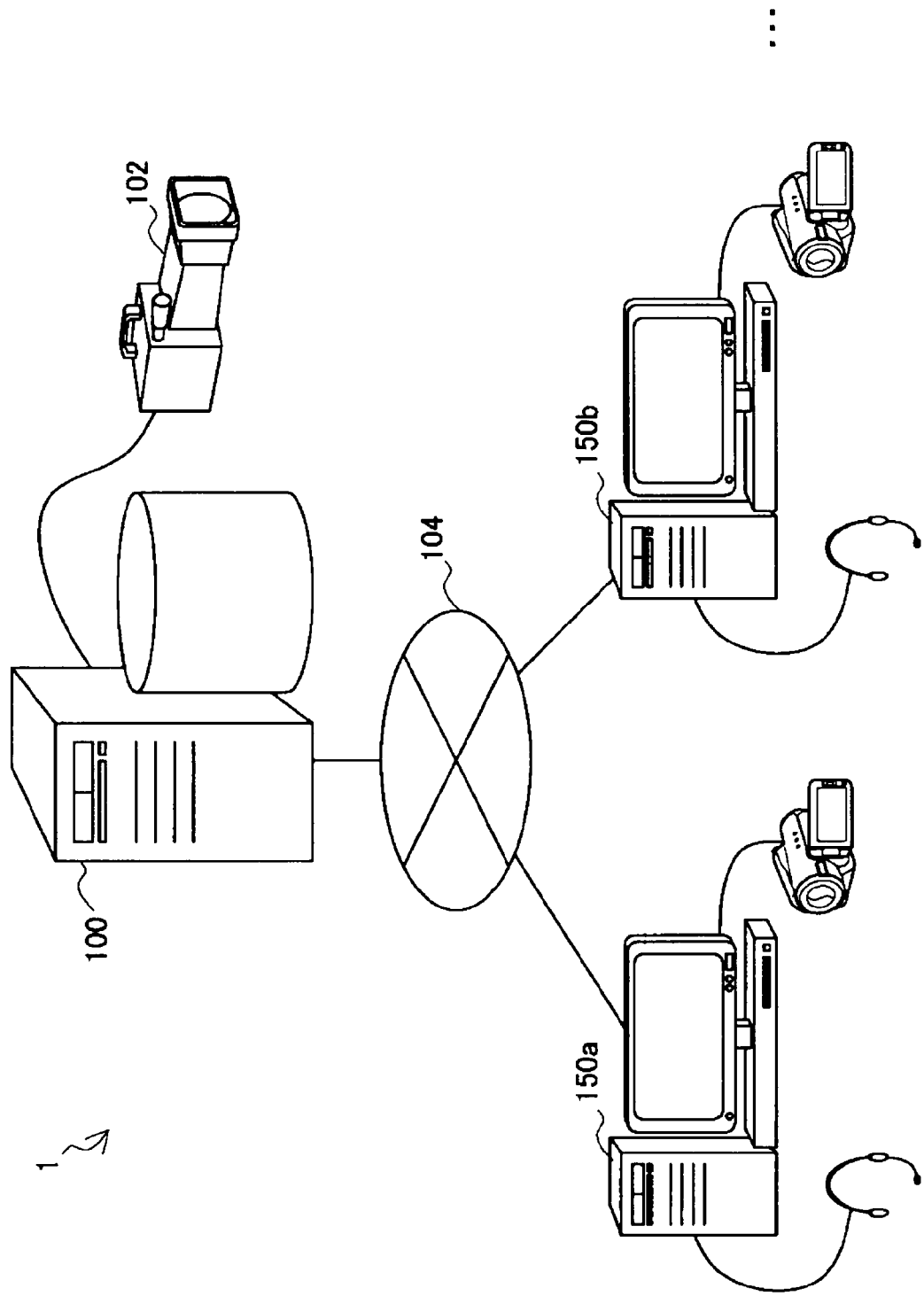
FIG. 1 is a schematic view showing an overview of a contents processing system according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order:
1. First Embodiment
1-1. Overview of System
1-2. Configuration of Contents Server
1-3. Configuration of User Terminal
1-4. Process Flow
1-5. Alternative Example
2. Second Embodiment
2-1. Configuration of Contents Server
2-2. Configuration of User Terminal
3. Summary 1. First Embodiment 1-1. Overview of System An overview of a contents processing system according to a first embodiment of the present invention is described hereinafter with reference to FIGS. 1 and 2.

FIG. 1 is a schematic view showing an overview of a contents processing system 1 according to the first embodiment of the present invention. Referring to FIG. 1, the contents processing system 1 includes a contents server 100, an imaging device 102 and a plurality of user terminals 150a and 150b. The contents server 100 is connected to the user terminals 150a and 150b through a network 104. The contents server 100 is also connected to the imaging device 102.

The contents server 100 provides a contents delivery service to the respective user terminals 150a and 150b. The contents delivered from the contents server 100 may be moving images or sound taken by using the imaging device 102, for example. Alternatively the contents delivered from the contents server 100 may be video in virtual reality such as a video game space. For example, the contents server 100 first receives a connection request (login request) to the service from the user terminal 150a or 150b. Next, the contents server 100 delivers the prescribed contents to the user terminal 150a or 150b which is connected to the service after an authentication procedure, for example. At this time, the contents server 100 processes the contents according to a position in the virtual space which is selected by a user as described in detail later. Note that the contents server 100 is typically implemented as a general-purpose information processing device such as a PC (Personal Computer) or a work station, or an application-specific information processing device such as a household electrical appliance or a video game device.

The imaging device 102 may be a video camera capable of taking moving images, for example. The imaging device 102 outputs the moving images acquired by taking images of a prescribed subject to the contents server 100. It should be noted that a plurality of imaging devices 102 may be provided corresponding to the number of user positions where a user can be located in a virtual space, for example. Further, in the case where a virtual space corresponds to a virtual reality world such as a video game, for example, the imaging device 102 may not exist as an entity in the virtual reality world.

The network 104 may be a network of an arbitrary form such as the Internet, a LAN (Local Area Network) or a leased line. The network 104 may be wired or wireless.

The user terminal 150 is a terminal device that is used by a user who receives provision of the contents delivery service from the contents server 100. Although the two user terminals 150a and 150b are shown in this example, the number of user terminals 150 which can be connected to the contents server 100 is not limited thereto. In this specification, an alphabetical letter affixed to the reference symbol of elements of the same kind such as the user terminals 150a and 150b, for example, is omitted when there is no particular need to distinguish between them. For example, the user terminals 150a and 150b are referred to collectively as the user terminal 150.

The user terminal 150 makes a connection to (logs in) the contents delivery service of the contents server 100 according to an operation by a user, for example. The user terminal 150 then receives the contents delivered from the contents server 100. Further, a video camera and a microphone, for example, are connected to the user terminal 150. The user terminal 150 then transmits video and sound that are captured by shooting the action of a user watching the contents to the contents server 100 through the network 104. The user terminal 150 is implemented as a terminal device such as a PC, a PDA (Personal Digital Assistants), a cellular phone, a video game device or a household electrical appliance, for example.

Figure 2:
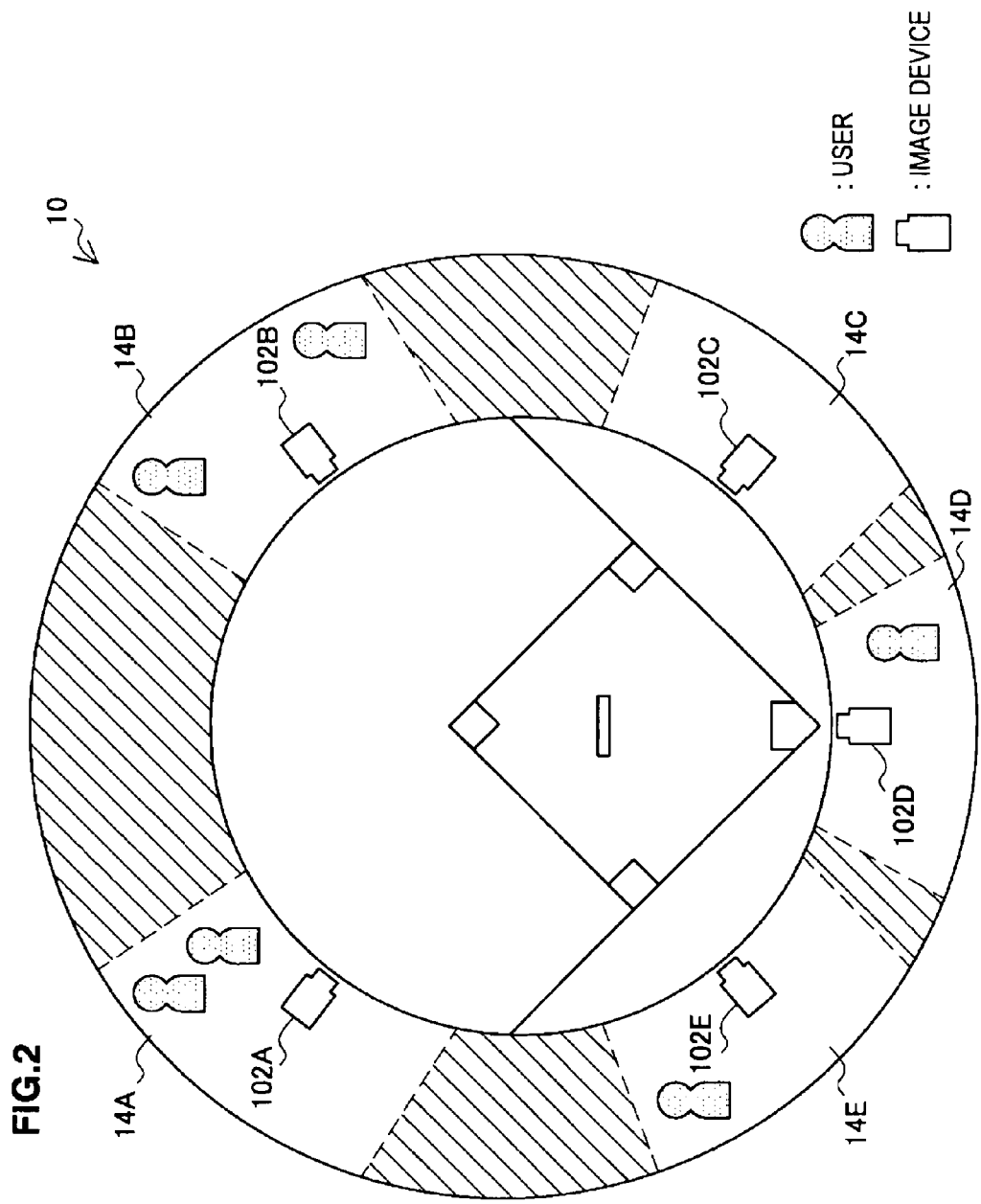
FIG. 2 is a schematic view showing an example of a virtual space where a plurality of user positions are provided.

FIG. 2 is a schematic view showing an example of a virtual space where a plurality of user positions selectable by a user is provided. The following description is based on the assumption that the contents server 100 delivers video and sound of a baseball game as the contents delivery service.

Referring to FIG. 2, a virtual space 10 that imitates the shape of a stadium where a baseball game is played is shown. In the virtual space 10, a plurality of user positions 14A, 14B, 14C, 14D and 14E where audiences can be seated are placed on the periphery of a field of a baseball field. The user position 14A is a position corresponding to left outfield seats of a stadium in the real space. The user position 14B is a position corresponding to right outfield seats of a stadium in the real space. The user position 14C is a position corresponding to first-base-side infield seats of a stadium in the real space. The user position 14D is a position corresponding to backstop seats of a stadium in the real space. The user position 14E is a position corresponding to third-base-side infield seats of a stadium in the real space. The user positions 14A to 14E are respectively associated with imaging devices 102A to 102E. The entities of the imaging devices 102A to 102E are placed in the positions corresponding to the respective user positions of a stadium in the real space.

The contents server 100 processes and delivers video and sound that are output from the imaging device 102 associated with a selected user position to the user terminal 150 of a user who has selected one of the plurality of user positions in the virtual space 10, for example.

Note that, in the case where the contents server 100 delivers video of a soccer game, for example, a virtual space that imitates the shape of a soccer stadium and includes a plurality of user positions in the positions of audience seats can be used instead of the virtual space 10. Further, in the case where the contents server 100 delivers video of a virtual reality world of a video game, for example, a virtual space in which user positions are respectively associated with a plurality of view points in the virtual reality world can be used.

A specific configuration of the contents server 100 that processes contents according to a user position is described hereinbelow.

1-2. Configuration of Contents Server

Figure 3:
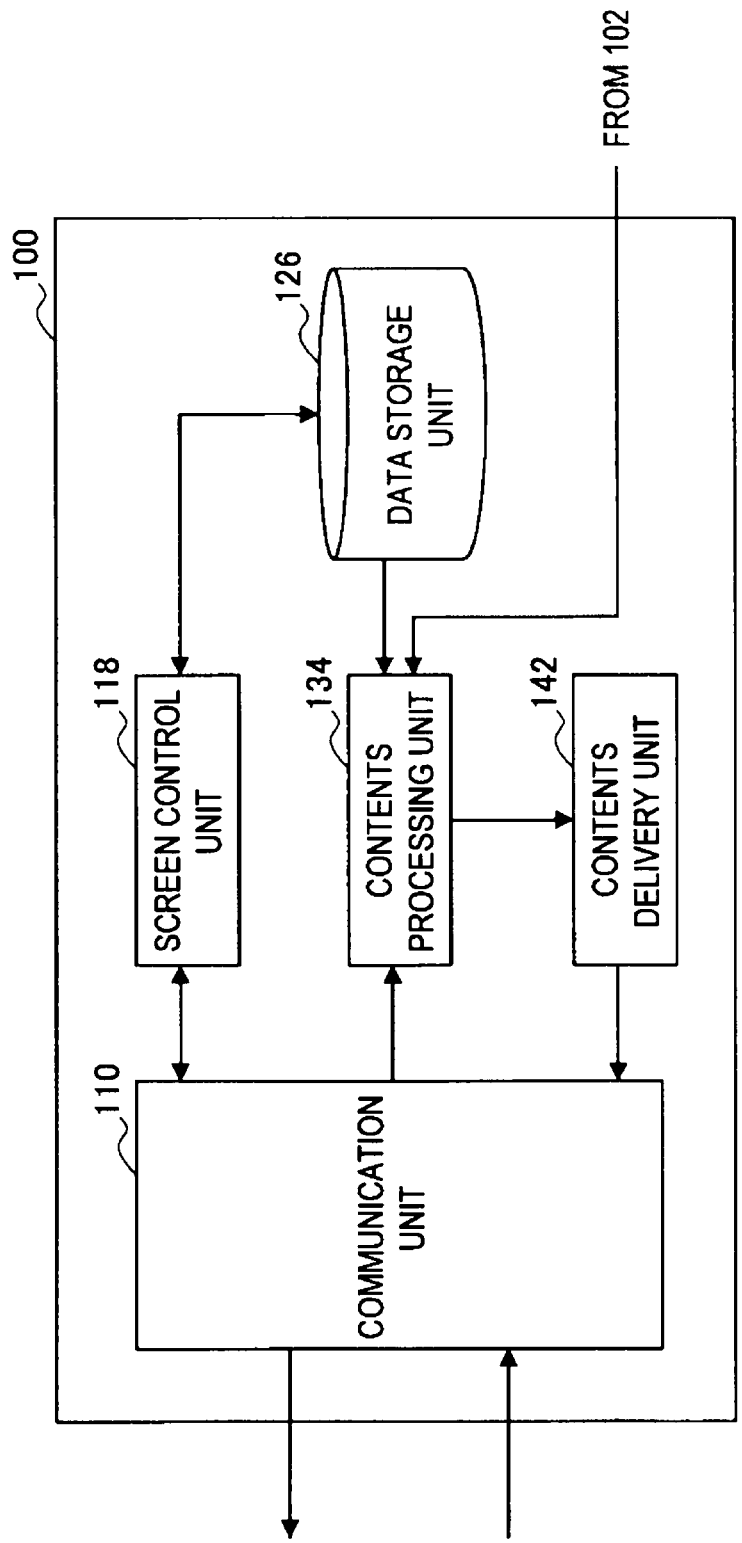
FIG. 3 is a block diagram showing a configuration of an information processing device according to a first embodiment.

FIG. 3 is a block diagram showing an example of a configuration of the contents server 100. Referring to FIG. 3, the contents server 100 includes a communication unit 110, a screen control unit 118, a data storage unit 126, a contents processing unit 134 and a contents delivery unit 142.

(Communication Unit)

The communication unit 110 mediates communication between the contents server 100 and the user terminal 150. Specifically, if the communication unit 110 receives a communication packet containing a login request signal or a user position selection signal from the user terminal 150, for example, the communication unit 110 outputs the signal contained in the communication packet to the screen control unit 118. Further, if the communication unit 110 receives a signal for displaying a position selection screen on the user terminal 150 from the screen control unit 118, for example, the communication unit 110 generates a communication packet containing the signal and transmits it to the user terminal 150. Furthermore, transmission and reception of contents between the contents server 100 and the user terminal 150 are also performed through the communication unit 110.

(Screen Control Unit)

The screen control unit 118 controls a screen interface that is displayed on the user terminal 150 in relation to the contents delivery service. Specifically, the screen control unit 118 creates a position selection screen that allows a user to select one user position 14 from the plurality of user positions 14A to 14E in the above-described virtual space 10, for example, and makes the position selection screen displayed on the user terminal 150. The position selection screen may be a screen that offers a user a bird's eye view of the respective user positions 14A to 14E in the virtual space 10 as shown in FIG. 2, for example, and allows the user to select any one user position 14 by pointing. The position selection screen is created and output by the screen control unit 118 after login is succeeded between the user terminal 150 and the contents server 100, for example. In the position selection screen, an identifiers, icons or the like of users who are currently located in (log in) the respective user positions 14A to 14E, in addition to the plurality of user positions 14A to 14E, may be displayed, for example. In this case, a user position where a user is located may be selected by selecting any one of the displayed identifiers, icons or the like of users instead of directly selecting any one user position. If any user position 14 is selected through the position selection screen, the screen control unit 118 outputs a set of a user position ID that identifies the selected user position 14 and a user ID that identifies the user who has selected the user position 14 to the data storage unit 126, for example.

(Data Storage Unit)

The data storage unit 126 mainly stores user data 128 and user position data 130 that are used for the contents delivery service by the contents server 100 with use of a recording medium such as a hard disk or semiconductor memory, for example.

FIG. 4 is an explanatory view showing an example of the user data 128 that is stored in the data storage unit 126 according to the embodiment. Referring to FIG. 4, the user data 128 has three data items: "user ID", "status" and "friend user".

The "user ID" is an identifier for uniquely identifying a user who uses the contents delivery service. In the example of FIG. 4, three users with the user ID "U11", "U12" or "U13" are shown.

The "status" is information indicating whether each user is currently connected to the contents delivery service. In the example of FIG. 4, the users U11 and U12 are currently connected to the contents delivery service (i.e. login). On the other hand, the user U13 is not currently connected to the contents delivery service (i.e. logout). Such a status is updated by the screen control unit 118 when a user logs in the contents delivery service through a certain login screen or when a user logs out, for example.

The "friend user" is an additional item for registering in advance other users with whom each user wishes to enjoy watching contents together, for example. In the example of FIG. 4, the friend user of the user U11 is the user U13. The friend user of the user U12 is users U15 and U16. The friend user of the user U13 is the user U11. It should be noted that data of the friend user is not necessarily registered in the user data 128.

FIG. 5 is an explanatory view showing an example of the user position data 130 that is stored in the data storage unit 126 according to the embodiment. Referring to FIG. 5 the user position data 130 has three data items: "user position ID", "opposite position" and "user list" which is an array of user IDs of a plurality of users.

The "user position ID" is an identifier for uniquely identifying each user position 14 which is selectable by a user in the virtual space 10 shown in FIG. 2, for example. In the example of FIG. 5, three user positions with the user position ID "14A", "14B" or "14C" are shown.

The "opposite position" is an item indicating the user position ID of the user position 14 located on the opposite side of a field which is a target of shooting in the virtual space 10 when viewed from each user position 14. In the example of FIG. 5, the opposite position of the user position 14A is the user position 14C. The opposite position of the user position 14B is the user position 14E. The opposite position of the user position 14C is the user position 14A. It should be noted that the user position 14 as the opposite position is not necessarily set for all user positions 14.

The "user list" is an array of the user IDs with respect to each user position and shows a list of the user IDs of currently connected users who have selected each user position. In the example of FIG. 5, the user U11 and the user U13 are included in the user list of the user position 14A. Further, the user U12 and the user U14 are included in the user list of the user position 14B. This indicates that the users U11, U12, U13 and U14 are logging in the contents delivery service at this point of time, and the users U11 and U13 have selected the user position 14A, and the users U12 and U14 have selected the user position 14B. On the other hand, no user is located in the user position 14C at this point of time. The user list is updated by the screen control unit 118 when a user selects any user position 14 through the above-described position selection screen or when a user cancels selection (or logs out), for example.

Figure 6:
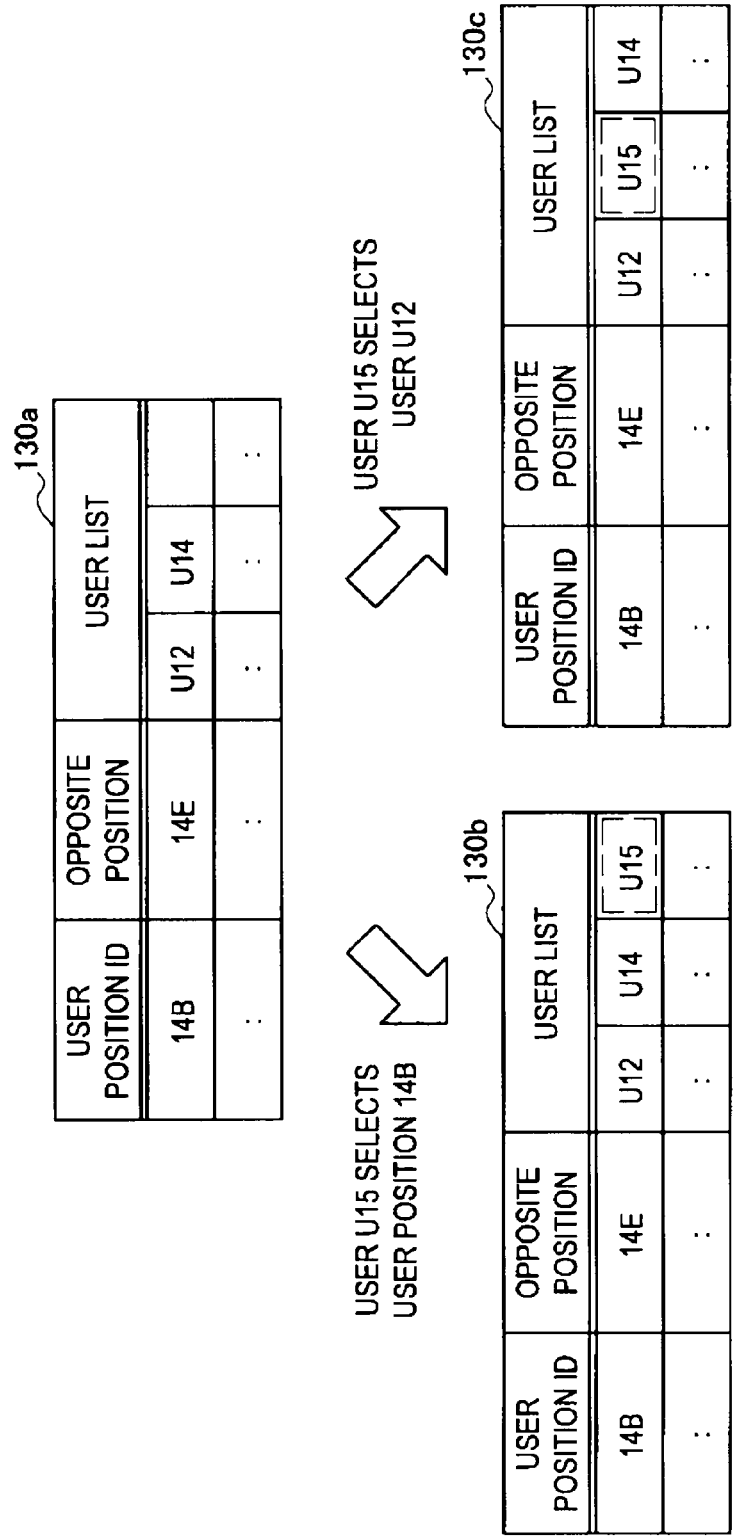
FIG. 6 is an explanatory view showing update of user position data upon login of a new user.

FIG. 6 is an explanatory view showing the way the user position data 130 stored in the data storage unit 126 is updated when a user newly logs in the contents delivery service of the contents server 100.

Referring to FIG. 6, three data examples of user position data 130a, 130b and 130c are shown. In the user position data 130a, the user list of the user position 14B includes the users U12 and U14. Assume, for example, that the user U15 who is a new user selects the user position 14B on the position selection screen. In this case, the screen control unit 118 adds the user U15 to the end of the user list of the user position 14B of the user position data 130 stored in the data storage unit 126, for example (cf. the user position data 130b). On the other hand, assume, for example that the user U15 who is a new user selects the user U12 located in the user position 14B on the position selection screen. Then, the screen control unit 118 inserts the user U15 next to the selected user U12 in the user list of the user position 14B of the user position data 130 stored in the data storage unit 126, for example (cf. the user position data 130c). The user U15 can be thereby located next to the user U12 in the virtual space 10 as if the user U15 were seated next to the user U12 with whom the user U15 wishes to watch a game together in the real space, for example.

With such a structure of the user position data 130, the situation where users who cheer for the same team or player get together in one user position in the virtual space 10 and users who wish to watch a game together are located close to each other in one user position can be produced in the virtual space 10, for example.

(Contents Processing Unit)

When delivering contents to a user, the contents processing unit 134 receives moving images containing video and sound from the imaging device 102 that is associated with the user position 14 in which a delivery destination user is located. The moving images supplied from the imaging device 102 may be moving images of a baseball game that is played in a stadium in the real space or the like, for example. Further, the contents processing unit 134 receives video and sound of a user taken by each user terminal 150 through the communication unit 110, for example. The contents processing unit 134 then acquires the user positions of two or more users from the above-described user position data 130 and processes the contents to be delivered to the user terminal 150 according to the acquired user positions. Hereinafter, in this specification, the video supplied from the imaging device 102 is referred to as main video, and the video supplied from each user terminal 150 is referred to as user video. Likewise, the sound supplied from the imaging device 102 is referred to as main sound, and the sound supplied from each user terminal 150 is referred to as user sound.

For example, the contents processing unit 134 may process the contents to be delivered to the user terminal 150 according to the distance between the user positions of two or more users in the virtual space 10. Specifically, the contents processing unit 134 may synthesize each frame of the main video and each frame of the user video whose size has been changed depending on the distance between the user positions in each frame of video to be delivered to the user terminal 150, for example.

Figure 7:
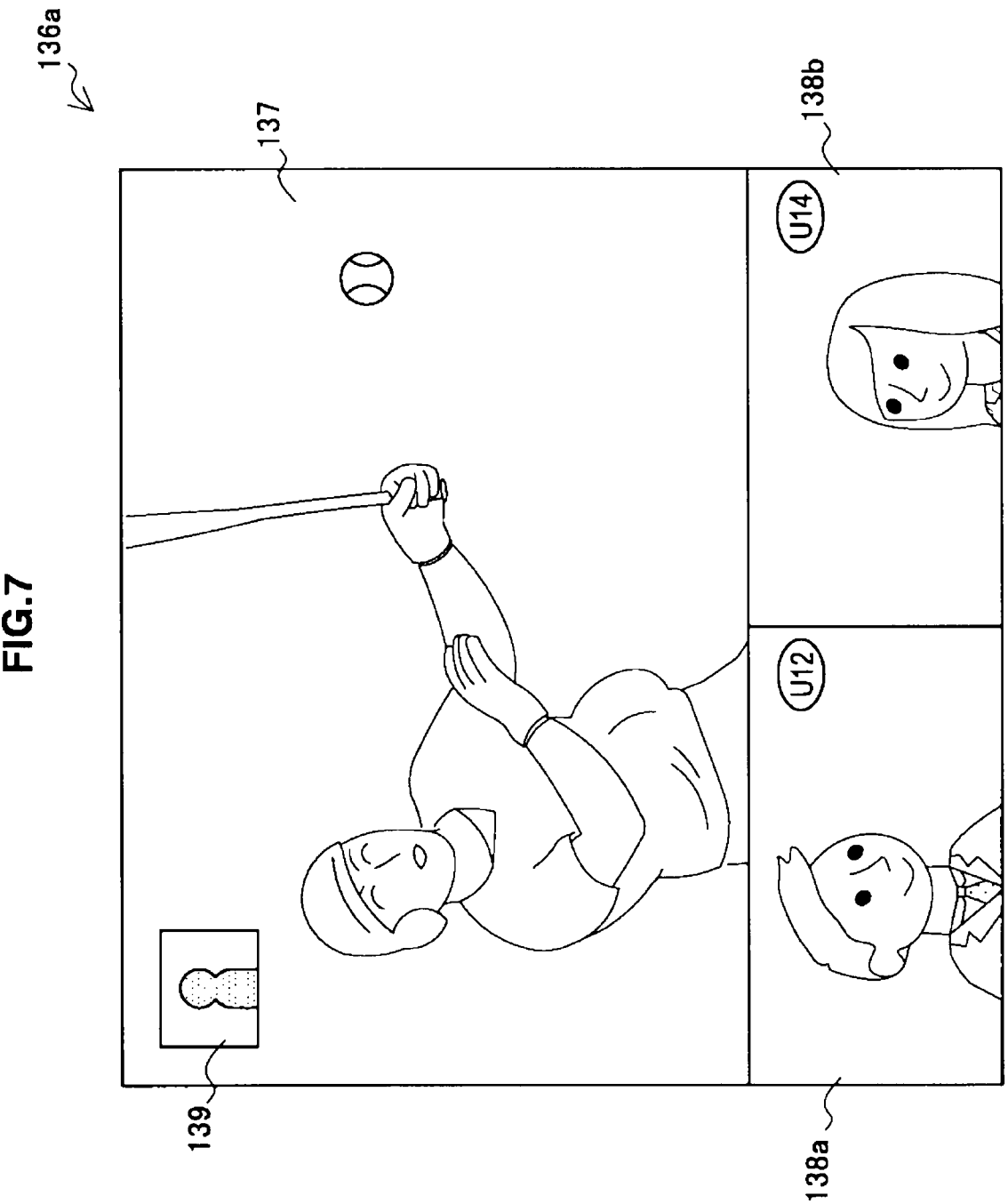
FIG. 7 is an explanatory view showing an example of contents delivered to a user terminal in the first embodiment.

FIG. 7 is an explanatory view showing a frame 136a as an example of a frame contained in video that is delivered from the contents server 100 to the user terminal 150 in this embodiment. Referring to FIG. 7, the frame 136a contains a man video display area 137 and user video display areas 138a, 138b and 139.

It is assumed that the frame 136a is a frame of video that is delivered to the user terminal 150 being used by the user U15. It is also assumed that, at the time point of FIG. 7, the users U12, U15 and U14 are included in this sequence in the user list of the user position 14B in the virtual space 10 as shown in the user position data 130c of FIG.

In FIG. 7, user video that is supplied from the user terminal 150 being used by the user U12 is displayed in the user video display area 138a. Further, user video that is supplied from the user terminal 150 being used by the user U14 is displayed in the user video display area 138b. On the other hand, in the user video display area 139, user video that is supplied from the user terminal 150 being used by a user who is located in the user position 14E which is the opposite position of the user position 14B in which the user U15 is located. What is noticeable here is the sizes of the three user video display areas 138a, 138b and 139. The size of each user video display area (e.g. the number of pixels along one side etc.) can be determined so as to be in proportion to the weight according to the predetermined distance in the virtual space 10 for each positional relationship between users represented by the user list of the user position data 130, for example.

FIG. 8 is an explanatory view showing examples of the distance between users in the virtual space 10 and the weight according to the distance. Referring to FIG. 8, the distance between users in the virtual space 10 is determined according to the positional relationship represented by the user list. For example, in the case where the user positions of two users are different, it is determined that the distance between the user positions is 0.8 and the weight is 0.2. On the other hand, in the case where two users are located in the same user position, it is determined that the distance between the users is 0.1×N (N is 1 when adjacent to each other in the user list). In this case, the distance between the user U12 and the user U15 in the user position data 130c of FIG. 6 is 0.1×1=0.1. Further, the distance between the user U12 and the user U14 is 0.1×2=0.2. The weight between users located in the same user position is calculated as 1−0.1×N. Specifically, the weight between the user U12 and the user U15 in the user position data 130c of FIG. 6 is 1−0.1×1=0.9, for example. Further, the weight between the user U12 and the user U14 is 1−0.1×2=0.8. In conformity to the example of FIG. 8, the weight becomes a negative value if the number of users exceeds 10 in the same user position. In light of this, conditions that the value of the weight is set to a specific lower limit regardless of the example of FIG. 8 if the number of users exceeds a certain value may be added, for example.

According to the weight predetermined in this manner, the contents processing unit 134 synthesizes the frame of the main video and the frame of the user video in each frame of the video of the contents to be delivered to the user terminal 150.

Further, the contents processing unit 134 may synthesize sound of contents to be delivered to the user terminal 150 by using the value of the weight described with reference to FIG. 8, for example, according to the following expression:

[Math 1]

$$A_{dist} = A_{main} + \sum_{i} w_i A_{user\_i} \quad (1)$$

In the expression (1), $A_{dist}$ indicates sound of contents to be delivered to the user terminal 150. $A_{main}$ indicates main sound, and $A_{user\_i}$ indicates user sound from the user terminal 150 that is used by a user i. Further, $w_i$ indicates the value of the weight according to the distance between a contents delivery destination user and a user i, which is determined according to the association table of FIG. 8, for example.

As described above, by changing the size of the user video superimposed on the main video, the volume of the user sound superimposed on the main sound or the like according to the distance between users in the virtual space 10, a user can more strongly recognize the action of other users located nearby. Particularly, by increasing the weight of the user video or the user sound of users who are located in the same user position, a user can share the main video or the main sound while more closely feeling the video or the sound of the users who cheer for the same team or player, for example.

Figure 9:
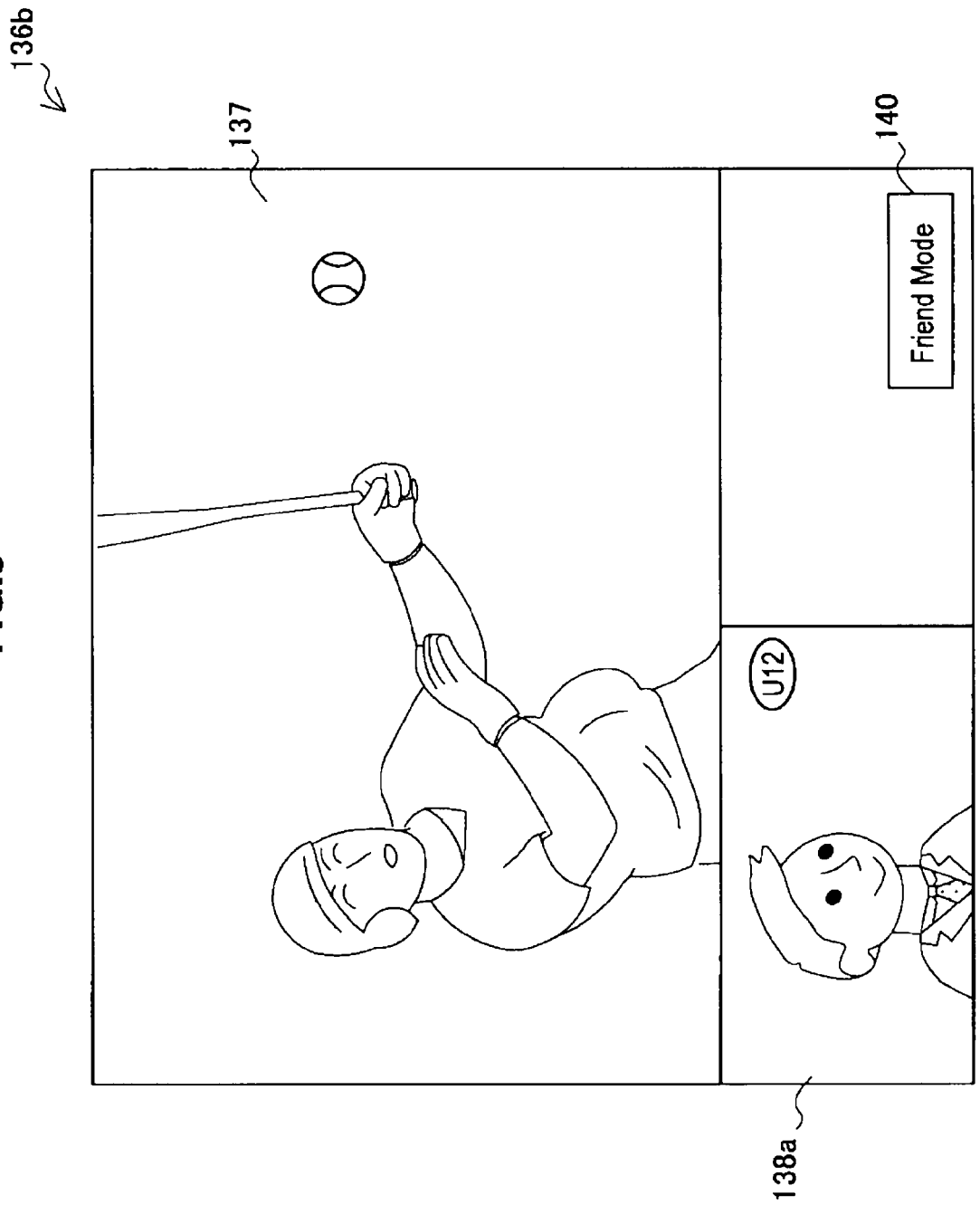
FIG. 9 is an explanatory view showing another example of contents delivered to a user terminal in the first embodiment.

Note that the contents processing unit 134 may superimpose only the user video and the user sound of a user who is in the relationship of the friend user with a contents delivery destination user on the main video and the main sound as shown in FIG. 9, for example.

FIG. 9 is an explanatory view showing a frame 136b as another example of the frame contained in the video that is delivered from the contents server 100 to the user terminal 150 in this embodiment. Referring to FIG. 9, the frame 136b includes a man video display area 137 and a user video display area 138a. Specifically, in this case, only the user video of the user U12 in the relationship of the friend user with the user U15 is superimposed on the main video in the frame 136b, unlike the frame 136a in FIG. 7. The size of the user video of the friend user can be also determined so as to be in proportion to the weight according to the distance between the contents delivery destination user and the friend user in the virtual space 10, for example.

The following expression represents a composite expression in the case where only the user sound of the friend user is superimposed on the main sound as the sound of contents to be delivered to the user terminal 150.

[Math 2]

$$A_{dist} = A_{main} + \sum_{i \in Friend} w_i A_{user\_i} \quad (2)$$

In this case, the scope of the user sounds to be superimposed is limited to those of the friend users of a contents delivery destination user (i indicates each friend user).

(Contents Delivery Unit)

The contents delivery unit 142 delivers the contents including the video and the sound that are output after the above-described processing by the contents processing unit 134 to the user terminal 150 through the communication unit 110, for example.

A specific configuration of the user terminal 150 that is provided with delivery of the contents from the contents server 100 which is described above is described hereinbelow.

1-3. Configuration of User Terminal

Figure 10:
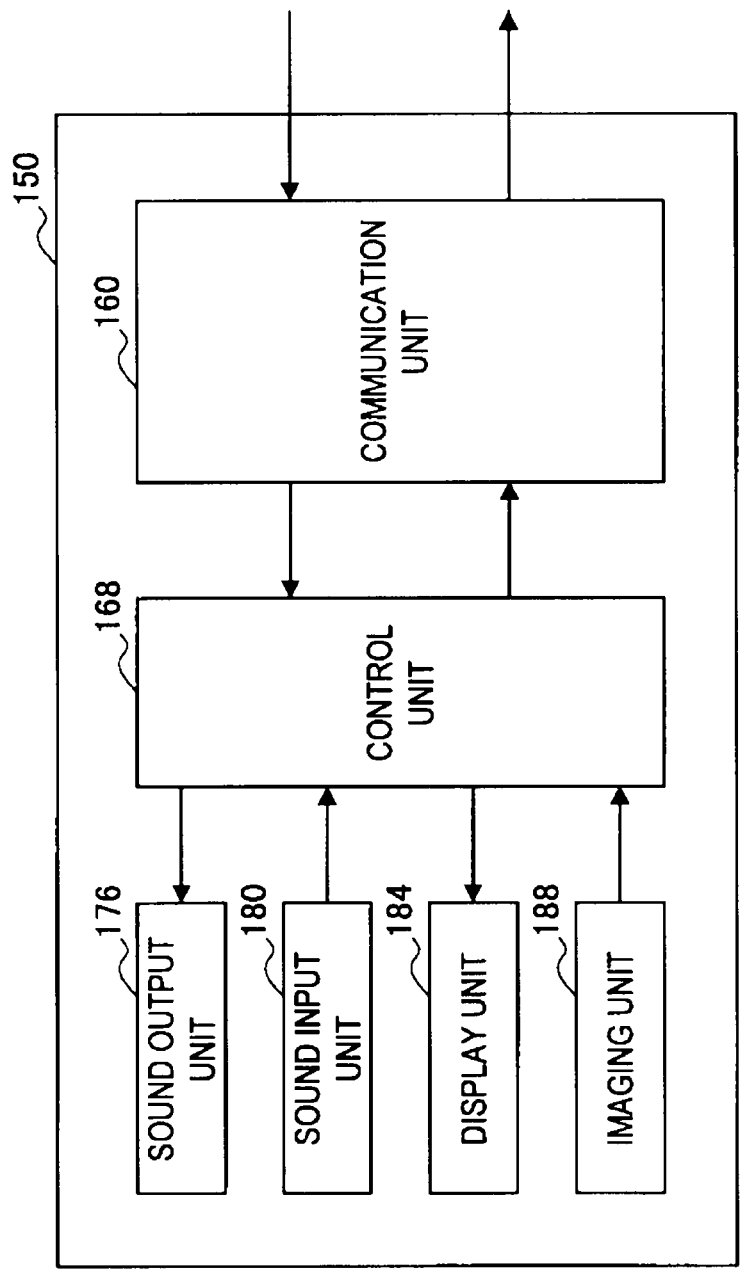
FIG. 10 is a block diagram showing a configuration of a user terminal according to the first embodiment.

FIG. 10 is a block diagram showing an example of a configuration of the user terminal 150. Referring to FIG. 10, the user terminal 150 includes a communication unit 160, a control unit 168, a sound output unit 176, a sound input unit 180, a display unit 184 and an imaging unit 188.

The communication unit 160 mediates communication between the user terminal 150 and the contents server 100. Specifically, the communication unit 160 transmits a communication packet containing a login request signal or a user position selection signal to the contents server 100, for example, according to an operation of a user on a screen displayed by the display unit 184, for example. Further, if the communication unit 160 receives a communication packet containing contents data such as video or sound from the contents server 100, for example, the communication unit 160 outputs the contents data to the display unit 184 or the sound output unit 176 so that the contents are reproduced.

The control unit 168 controls the overall functions of the user terminal 150 such as communication through the communication unit 160, reproduction of contents by the sound output unit 176 and the display unit 184, input of user sound by the sound input unit 180, capture of user video by the imaging unit 188 and so on. For example, the control unit 168 may have a function of dividing a video channel and a sound channel from contents data received by an arbitrary format such as MPEG (Moving Picture Experts Group)-4 and delivering them to the display unit 184 and the sound output unit 176, respectively, for example.

The sound output unit 176 reproduces sound data that is supplied from the control unit 168 and outputs sound with use of an arbitrary speaker, for example. The sound input unit 180 acquires user sound that includes voice of a user or the like with use of an arbitrary microphone, generates sound data and outputs it to the control unit 168, for example. The display unit 184 reproduces video data that is supplied from the control unit 168 and displays video with use of an arbitrary display device, for example. The imaging unit 188 captures images of a user as a subject with use of an arbitrary imaging device, generates video data and outputs it to the control unit 168. The sound data that is input to the control unit 168 from the sound input unit 180 and the video data that is input to the control unit 168 from the imaging unit 188 are transmitted to the contents server 100 through the communication unit 160.

The flow of processing between the user terminal 150 and the contents server 100 is described hereinafter with reference to FIGS. 11 and 12.

1-4. Process Flow

Figure 11:
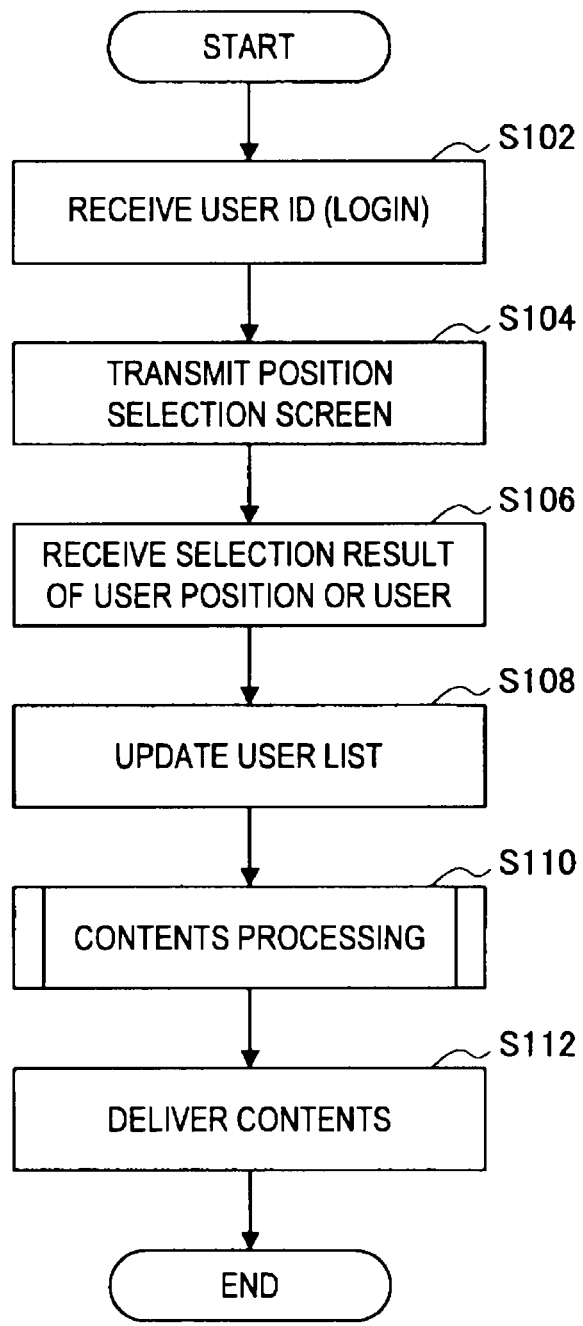
FIG. 11 is a flowchart showing a process flow from login to contents delivery according to the first embodiment.

FIG. 11 is a flowchart showing the process flow from user login to contents delivery according to the embodiment.

Referring to FIG. 11, the communication unit 110 of the contents server 100 first receives a user ID that is input through a prescribed login screen in the user terminal 150 and a password (that is input according to need) from the user terminal 150 (S102). Then, the status of the user data 128 that is stored in the data storage unit 126 of the contents server 100 is updated to the state where the user is logging in the contents delivery service.

Next, the screen control unit 118 of the contents server 100 transmits the position selection screen to the user terminal 150 (S104). In the position selection screen, a plurality of user positions 14 in which a user can be located in the virtual space 10 are displayed, for example, so that the user can select any one of the user positions 14.

Then, the communication unit 110 of the contents server 100 receives a user position ID that identifies the user position 14 selected by the user terminal 150 or a user ID that identifies a selected user from the user terminal 150 (S106). Then, in the user position data 130 stored in the data storage unit 126 of the contents server 100, a user ID of a new user is added to the user list of the selected user position 14 according to the technique described with reference to FIG. 6, for example (S108).

After that, the contents processing unit 134 processes the contents to be delivered to the user terminal 150 by using the main video or the main sound that is supplied from the imaging device 102 and the user video or the user sound that is supplied from the respective user terminals 150, for example (S110). The contents processing in this step is described in further detail later. The contents processed by the contents processing unit 134 is then delivered to the user terminal 150 by the contents delivery unit 142 (S112).

Figure 12:
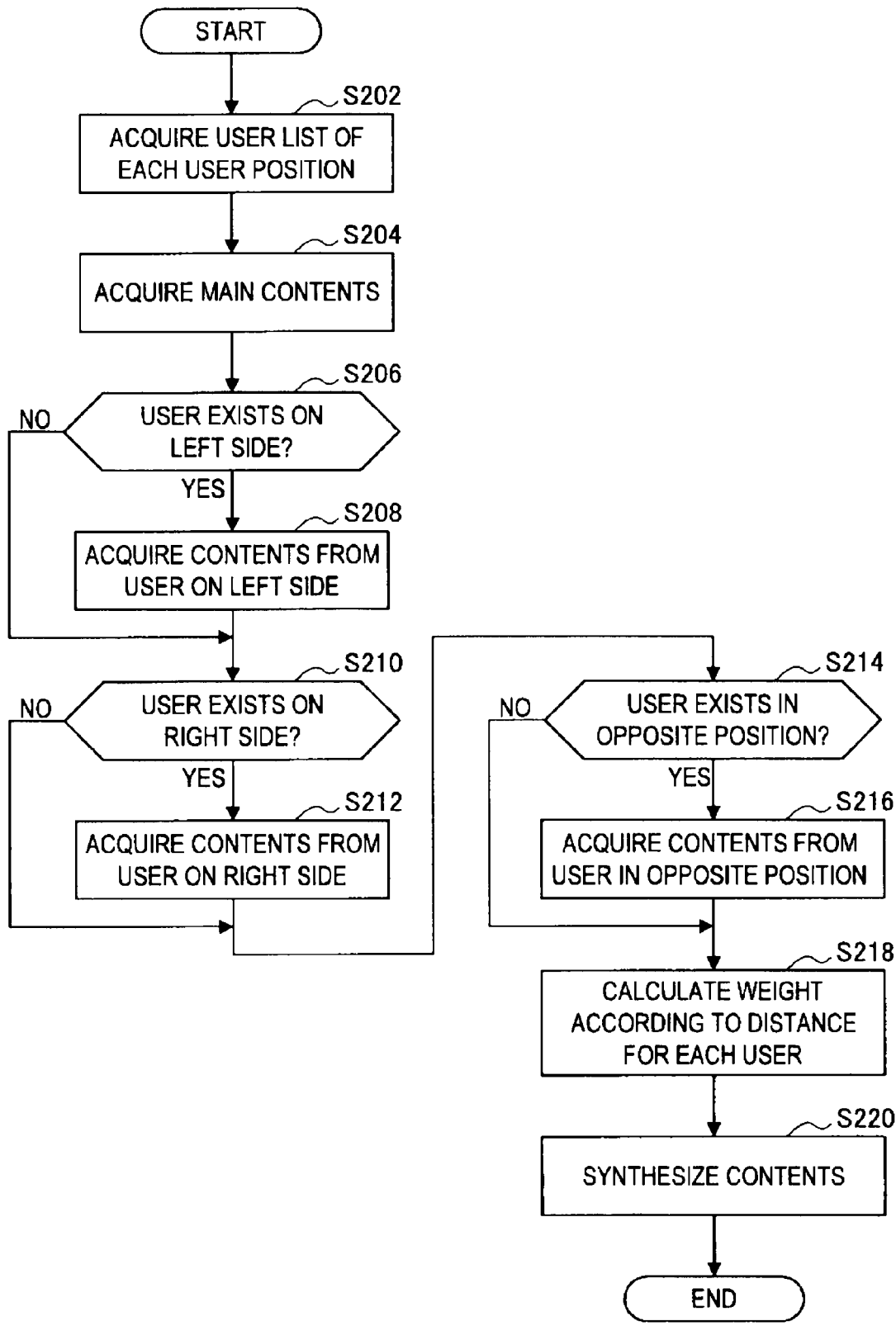
FIG. 12 is a flowchart showing a process flow of contents processing according to the first embodiment.

FIG. 12 is a flowchart showing the more specific process flow of the contents processing by the contents processing unit 134 according to the embodiment.

Referring to FIG. 12, the contents processing unit 134 first acquires the user list of each user position from the user position data 130 that is stored in the data storage unit 126 (S202).

Next, the contents processing unit 134 sequentially acquires contents that include main video and main sound from the imaging device 102, for example (S204).

Then, the contents processing unit 134 determines whether another user exists on the left side of the contents delivery destination user in the use list acquired in the step S202 (S206). If another user exists on the left side of the contents delivery destination user, the contents processing unit 134 acquires contents including user video and user sound from the user terminal 150 of the user on the left side (S208). On the other hand, if another user does not exist on the left side of the contents delivery destination user, the step S208 is skipped.

Further, the contents processing unit 134 determines whether another user exists on the right side of the contents delivery destination user in the use list acquired in the step S202 (S210). If another user exists on the right side of the contents delivery destination user, the contents processing unit 134 acquires contents including user video and user sound from the user terminal 150 of the user on the right side (S212). On the other hand, if another user does not exist on the right side of the contents delivery destination user, the step S212 is skipped.

Furthermore, the contents processing unit 134 determines whether another user exists in the opposite position to the user position in which the contents delivery destination user is located in the use list acquired in the step S202 (S214). If another user exists in the opposite position, the contents processing unit 134 acquires contents including user video and user sound from the user terminal 150 of the user located in the opposite position (S216). On the other hand, if another user does not exist in the opposite position, the step S216 is skipped.

Then, the contents processing unit 134 calculates the weight according to the distance from the contents delivery destination user with respect to each user from which the user video and the user sound are acquired in the steps S208, S212 and S216 (S218).

After that, the contents processing unit 134 synthesizes the respective contents according to the calculated weight, thereby creating contents to be delivered to the user terminal 150 (S220). Specifically, the contents processing unit 134 superimposes the user video of the users on the left wide, on the right side and in the opposite position on the main video, for example, and sequentially creates the frame 136a as shown as an example in FIG. 7. Further, the contents processing unit 134 superimposes the respective user sounds on the main sound according to the above-described expression (1).

Finally, the contents processing unit 134 outputs the generated contents to the contents delivery unit 142, and the process in the flowchart thereby ends.

The above-described series of contents processing, excluding the step S202, is performed repeatedly for each frame of video, for example, with respect to each user as a contents delivery destination. On the other hand, the above-described step S202 is performed only once in the contents processing unit 134 unless a change is made to the user list.

The first embodiment of the present invention is described in detail above with reference to FIGS. 1 to 12. According to the embodiment, the contents to be delivered to the user terminal 150 are processed depending on the user position in the virtual space 10 which is selected with use of the position selection screen. Specifically, a user who uses the contents delivery service according to the embodiment can select the user position which the user wishes to join for watching or viewing from a plurality of user positions where the user can be located in the virtual space 10. Then, video and sound of other users that are weighted according to the selected user position are delivered in addition to the main contents from the contents server 100 to the user terminal 150. At this point, the weights for user videos and user sounds of other users located in the same user position, particularly another user located next in the user list, can be set to be large. This enhances togetherness among users who enjoy the contents, for example. As a result, a user can experience reality as if the user were located in the real space.

The format of the user list that is stored with respect to each user position in a virtual space is not limited to the format described with reference to FIG. 5. An alternative example of the format of the user list is described hereinafter.

1-5. Alternative Example

FIG. 13 is an explanatory view showing an example of user position data 131 that is stored in the data storage unit 126 according to an alternative example. Referring to FIG. 13, the user position data 131 has four data items: "user position ID", "opposite position", "seat ID" and "user list".

Like the user position data 130 shown in FIG. 5, the "user position ID" is an identifier for uniquely identifying each user position 14 which is selectable by a user. The "opposite position" is an item indicating the user position ID of the user position 14 located on the opposite side in the virtual space 10 when viewed from each user position 14.

The "seat ID" is an item that is added to enable a plurality of users to be located in the same distance. A plurality of seat IDs can exist for one user position. In the example of FIG. 13, two seat IDs of "SA01" and "SA02" exist for the user position 14A. Further, two seat IDs of "SB01" and "SB02" exist for the user position 14B.

The "user list" is an array of the user IDs with respect to each user position. In this alternative example, in the user list, the user ID of a currently connected user is stored with respect to each of the plurality of seat IDs that can exist for one user position 14. In the example of FIG. 13, in the user list of the user position 14A, a user U11 exists in the seat SA01, and a user U13 exists in the seat SA02. Further, in the user list of the user position 14B, users U12 and U14 exist in the seat SB01, and a user U17 exists in the seat SB02. The user list is updated by the screen control unit 118 when a user selects any user position or user through the position selection screen or when a user cancels selection (or logs out), for example.

Figure 14:
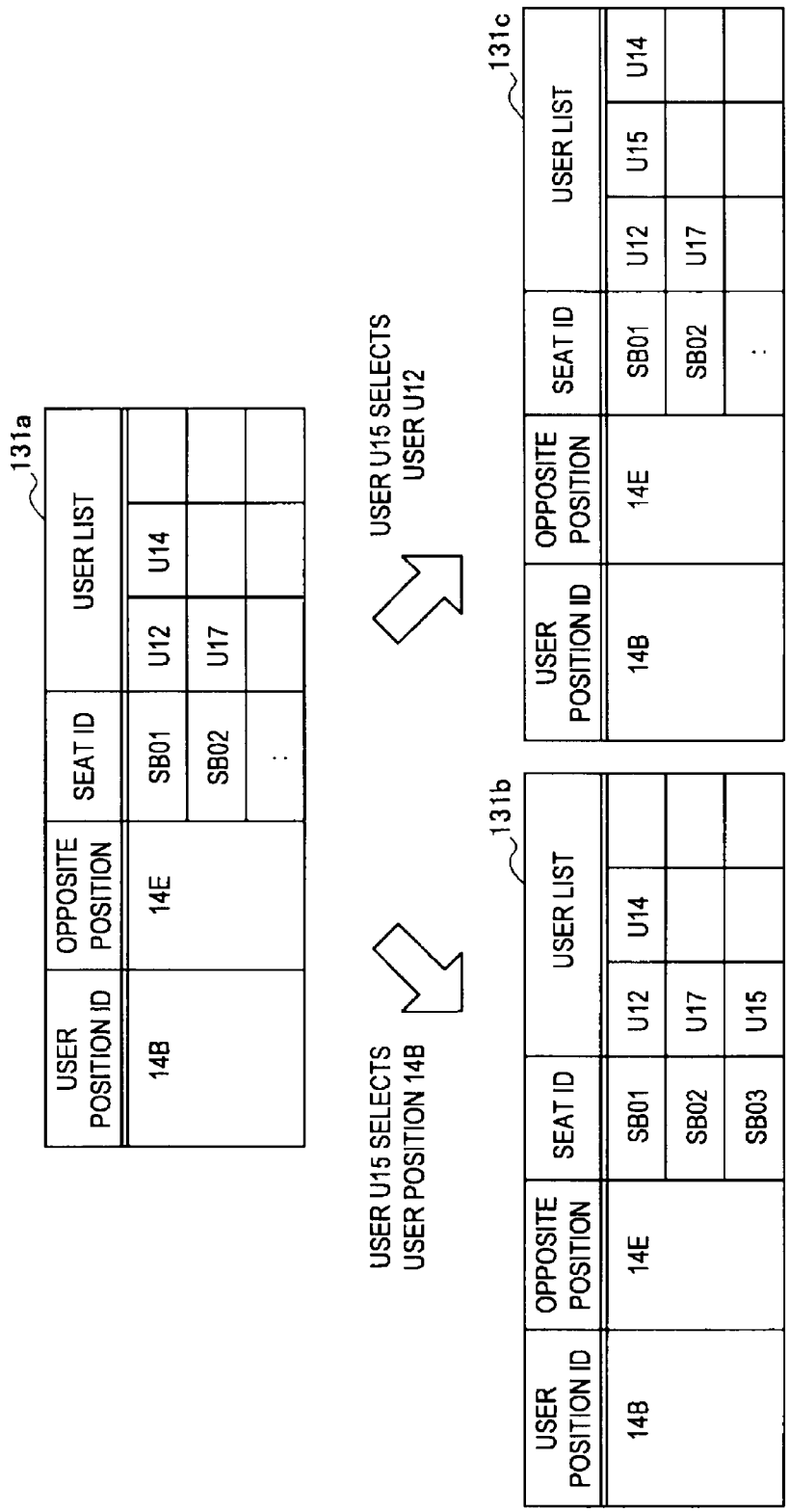
FIG. 14 is an explanatory view showing update of user position data upon login of a new user in the example of FIG. 13.

FIG. 14 is an explanatory view showing the way the user position data 131 according to the alternative example is updated when a user newly logs in the contents delivery service of the contents server 100.

Referring to FIG. 14, three data examples of user position data 131a, 131b and 131c are shown. In the user position data 131a, the users U12 and U14 are located in the seat SB01 of the user list of the user position 14B. Assume, for example, that the user U15 who is a new user selects the user position 14B on the position selection screen. In this case, the screen control unit 118 adds a new seat ID "SB03" to the user list of the user position 14B, and adds the user U15 to the seat SB03, for example (cf. the user position data 131b). On the other hand, assume, for example, that the user U15 who is a new user selects the user U12 located in the user position 14B on the position selection screen. Then, the screen control unit 118 inserts the user U15 next to the user U12 in the seat SB01 of the user list of the user position 14B, for example (cf. the user position data 131c).

FIG. 15 is an explanatory view showing an example of the weight according to the distance between users which can be predetermined corresponding to the user position data 131 according to the alternative example. Referring to FIG. 15, just like the example of FIG. 8, in the case where the user positions are different, it is determined that the distance between the user positions is 0.8 and the weight is 0.2. On the other hand, in the case where two users are located in the same user position and when their seats are different, it is determined that the distance between the users is $0.1 \times M$ (M is 1 when the seats are adjacent to each other in the user list). In this case, the distance between the user U12 and the user U17 in the user position data 131c of FIG. 15, for example, is $0.1 \times 1 = 0.1$. Further, the weight between the users located in the same user position is calculated as $1 - 0.1 \times M$. Further, in the case where two users are located in the same user position and when their seats are also the same, the distance between the users is determined to 0.0. Thus, the distance between the user U12 and the user U15 in the user position data 131c of FIG. 15 is 0.0. Further, the weight between the user U12 and the user U15 is 1.0.

As described in the alternative example, by locating a plurality of users in the same seat in each user list with respect to each user position, the distance between a plurality of users who wish to enjoy contents together can be set to the same value, and the contents can be processed with use of the weight according to the distance, for example.

2. Second Embodiment

In the first embodiment of the present invention described above, the user video and the user sound supplied from each user terminal 150 are respectively superimposed on the main video and the main sound to be watched or viewed by a user, so that one video and one sound are generated. Such an embodiment is effective in the case where only one display device or one sound output device can be used in the user terminal 150. On the other hand, in the case where a plurality of display devices can be used in the user terminal 150, for example, it is possible to further enhance reality experienced by a user by delivering main video and user video as separate channels so that they are displayed on different display devices. In light of this, a second embodiment of the present invention in which main video and user video are delivered through separate channels from a contents server to a user terminal is described in this section.

2-1. Configuration of Contents Server

Figure 16:
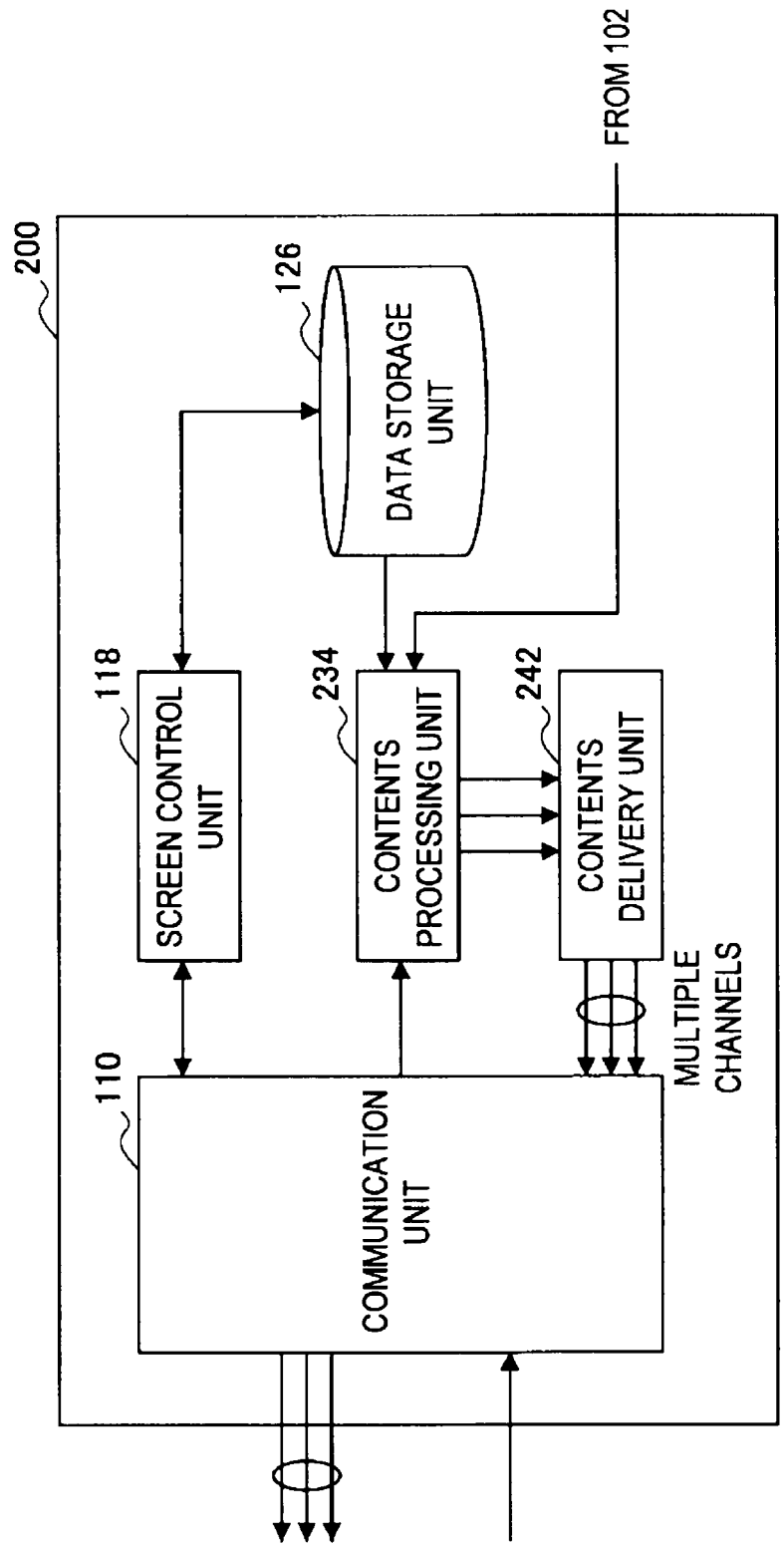
FIG. 16 is a block diagram showing a configuration of an information processing device according to a second embodiment.

FIG. 16 is a block diagram showing an example of a configuration of a contents server 200 according to the embodiment. Referring to FIG. 16, the contents server 200 includes a communication unit 110, a screen control unit 118, a data storage unit 126, a contents processing unit 234 and a contents delivery unit 242.

(Contents Processing Unit)

When delivering contents to a user, the contents processing unit 234, like the contents processing unit 134 according to the first embodiment described above, receives main video and main sound from the imaging device 102 that is associated with the user position 14 in which a destination user is located. Further, the contents processing unit 234 receives user video and user sound that are captured by each user terminal 250, which is described later, through the communication unit 110, for example. Then, the contents processing unit 234 processes contents to be delivered to the user terminal 250 according to a user position that is included in the user position data 130 stored in the data storage unit 126.

In this embodiment, the contents processing unit 234 generates composite contents data that includes a plurality of video channels as a result of processing. FIG. 17 is an explanatory view to describe contents delivered to the user terminal 250 in this embodiment.

Referring to FIG. 17, main video 236 that can be commonly delivered to the user terminals 250 of a plurality of users located in the same user position, and user videos 238 and 239 are shown, for example. On the main video 236, user video 241 of a user located in the opposite position to the user position of a contents delivery destination user is superimposed with the size corresponding to the distance between users. On the other hand, the user video 238 is user video of the user U22 located on the left side of the contents delivery destination user in the user list, for example. The user video 239 is user video of the user U24 located on the right side of the contents delivery destination user in the user list, for example. The contents processing unit 234 creates video channels respectively displaying such three videos and outputs them to the contents delivery unit 242.

Further, the contents processing unit 234 may output a sound channel created by superimposing the user sound on the main sound according to the above-described expression (1) to the contents delivery unit 242, for example. Alternatively, the contents processing unit 234 may create three sound channels respectively including the main sound, the user sound on the left side and the user sound on the right side, just like the three video channels shown in FIG. 17, and output them to the contents delivery unit 242, for example.

(Contents Delivery Unit)

The contents delivery unit 242 delivers the composite contents which can include the above-described plurality of video channels and sound channels that are output from the contents processing unit 234 to the user terminal 250 through the communication unit 110, for example.

2-2. Configuration of User Terminal

Figure 18:
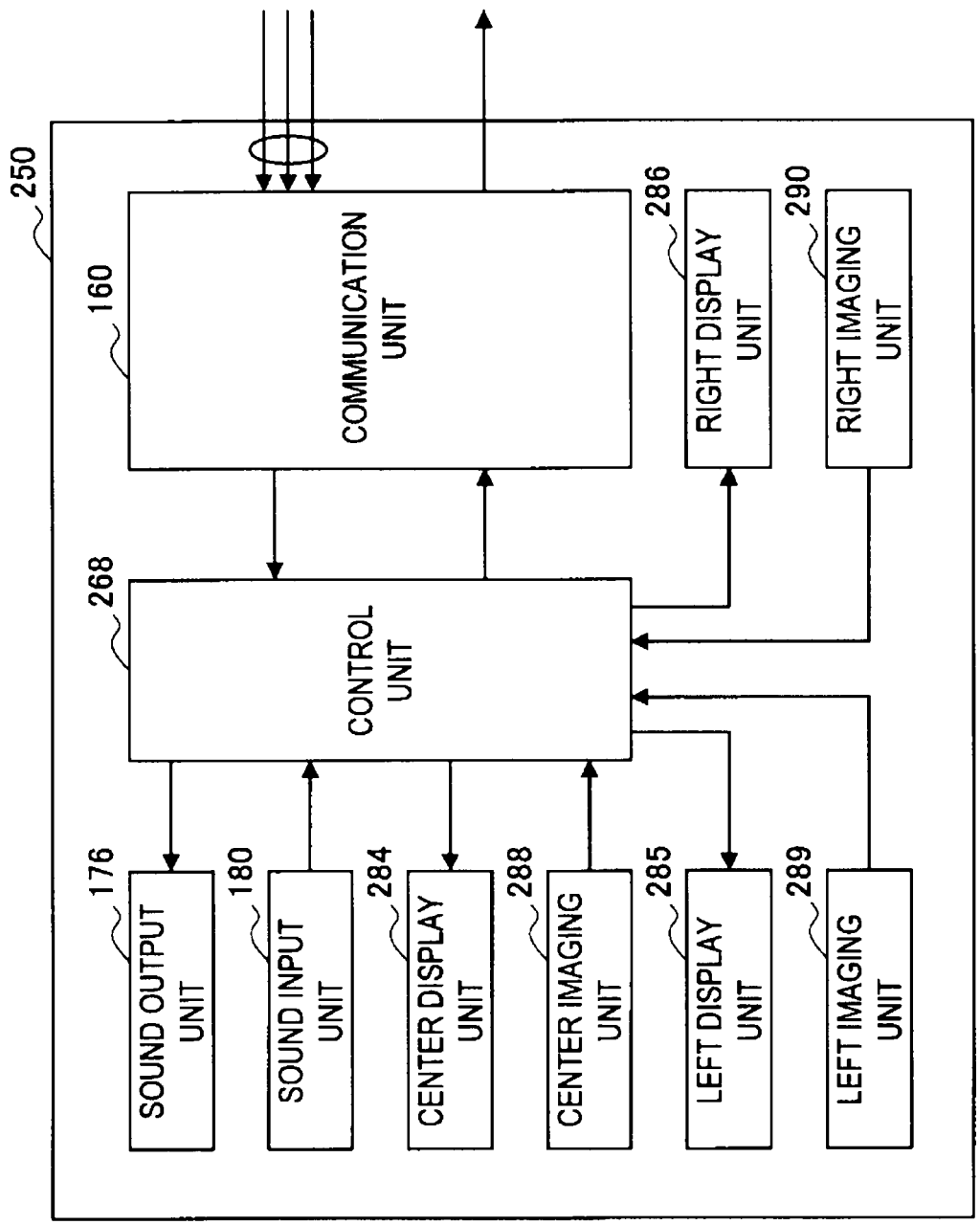
FIG. 18 is a block diagram showing a configuration of a user terminal according to the second embodiment.

FIG. 18 is a block diagram showing an example of a configuration of the user terminal 250 according to the embodiment. Referring to FIG. 18, the user terminal 250 includes a communication unit 160, a control unit 268, a sound output unit 176, a sound input unit 180, a center display unit 284, a center imaging unit 288, a left display unit 285, a left imaging unit 289, a right display unit 286 and a right imaging unit 290.

The control unit 268 controls the overall functions of the user terminal 250, just like the control unit 168 of the user terminal 150 according to the first embodiment. Further, the control unit 268 divides the above-described plurality of video channels and sound channels from the contents data received by an arbitrary format such as MPEG-4, for example. Then, the control unit 268 delivers the divided video channel to the corresponding display unit 284, 285 or 286 and delivers the sound channel to the sound output unit 176. For example, the main video 236 shown in FIG. 17 is delivered to the center display unit 284. The user videos 238 and 239 shown in FIG. 17 are delivered to the left display unit 285 and the right display unit 286, respectively.

The center display unit 284, the left display unit 285 and the right display unit 286 reproduce the video contained in the video channels delivered by the control unit 268 by using an arbitrary display device. The center imaging unit 288, the left imaging unit 289 and the right imaging unit 290 capture images of a user by using an arbitrary imaging unit, generates video data and outputs it to the control unit 268.

Figure 19:
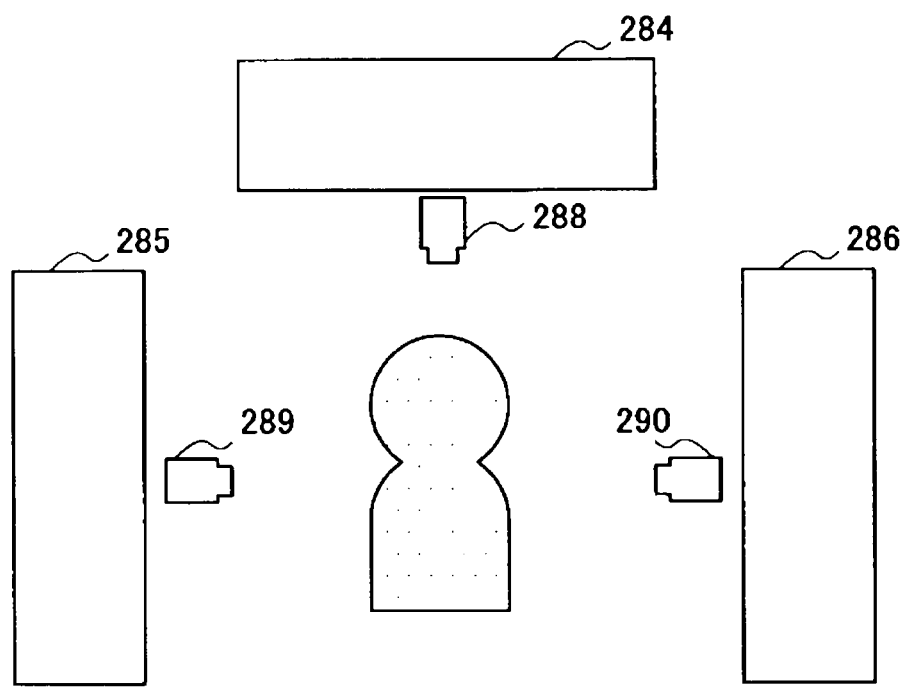
FIG. 19 is a block diagram showing an example of physical arrangement of elements of a user terminal according to the second embodiment.

FIG. 19 is a block diagram showing an example of physical arrangement of the elements of the user terminal 250 according to the embodiment shown in FIG. 18.

Referring to FIG. 19, a display device corresponding to the center display unit 284 and an imaging device corresponding to the center imaging unit 288 are located in front of a user. Further, a display device corresponding to the left display unit 285 and an imaging device corresponding to the left imaging unit 289 are located on the left side of a user. Further, a display device corresponding to the right display unit 286 and an imaging device corresponding to the right imaging unit 290 are located on the right side of a user. In FIG. 19, the physical arrangement of the communication unit 160, the control unit 268, the sound output unit 176 and the sound input unit 180 of the user terminal 250 is omitted in terms of clarifying the figure. The sound output unit 176 and the sound input unit 180 may be arranged separately in the center, left and right positions, just like the respective display units and the respective imaging units, for example.

By using the physical arrangement of the display units and the imaging units as shown in FIG. 19, the reality as if a plurality of users located in the same user position in the virtual space 10 were watching contents side by side, facing towards the main video is produced, for example. Further, if the physical arrangement as shown in FIG. 19 is used in the user terminals 250 of adjacent users, the video effect as shown in FIG. 20, for example, can be also produced.

Figure 20:
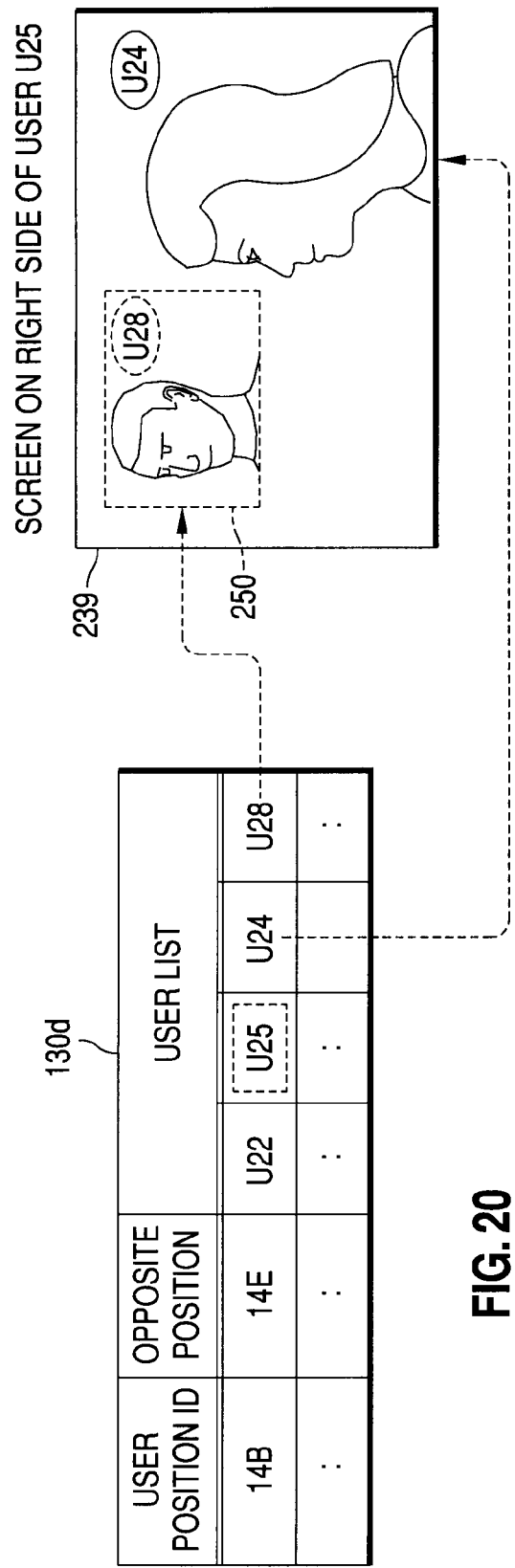
FIG. 20 is an explanatory view showing an example of user video displayed in a user terminal according to the second embodiment.

FIG. 20 is an explanatory view showing an example of user video displayed in the user terminal 250 according to the embodiment. The right part of FIG. 20 shows user video 239 taken in the user terminal 250 of the user U24. The user video 239 is video that is displayed on the right display unit 286 of the user terminal 250 of the user U25 which is contained in the user list of the user position 14B in the user position data 130d in the left part of FIG. 20, for example. Referring to the user position data 130d, the user U24 is located on the right side of the user U25 in the user list of the user position 14B. Further, the user U28 is located on the right side of the user U24. It is assumed that the physical arrangement as shown in FIG. 19 is used in the user terminals 250 of the adjacent users U25, U24 and U28. The video taken by the left imaging unit 289 of the user terminal 250 of the user U28 is thereby displayed on the right display unit 286 of the user terminal 250 of the user U24. Then, the video displayed on the right display unit 286 of the user terminal 250 of the user U24 is taken by the left imaging unit 289 of the user terminal 250 of the user U24, and displayed on the right display unit 286 of the user U25. As a result, the user U28, in addition to the user U24, appears in the user video 239 that is displayed on the right display unit 286 of the user terminal 250 of the user U25 shown in FIG. 20. With such a configuration of the user terminal 250, each user can experience a high degree of reality as if the user were watching contents while sharing the space with a plurality of users located in the same user position in the virtual space 10.

The second embodiment of the present invention is described in detail above with reference to FIGS. 13 to 20. According to the embodiment, first contents that include the main video or the main sound and second contents that include the user video or the user sound of users located next in the same user position are delivered in a composite manner from the contents server 200 to the user terminal 250. Then, in the user terminal 250, the first contents can be displayed in front of the user, and the second contents can be displayed on the left or right of the user, for example. Therefore, when watching the contents, the user can experience more enhanced reality, enjoying the feeling of togetherness with other users located in the user position which is selected by the user.

In the above example, the case where the contents server 200 relays the second contents indicating the action of users located next to each other in the same user position is described. However, alternatively, the second contents may be transmitted and received directly between the user terminals 250 of users located next to each other, for example. In this case, it is possible to reduce processing loads on the contents server 200.

3. Summary

According to the first embodiment or the second embodiment of the present invention described above, a user watches or views contents processed according to a position in a virtual space selected by the user, thereby improving reality experienced by the user.

The series of processing according to the first and second embodiments which is described in this specification is typically implemented by software. In the case of executing the series of or part of processing by software, a program constituting the software is executed by using a computer incorporated into dedicated hardware or a general-purpose computer shown in FIG. 21, for example.

Figure 21:
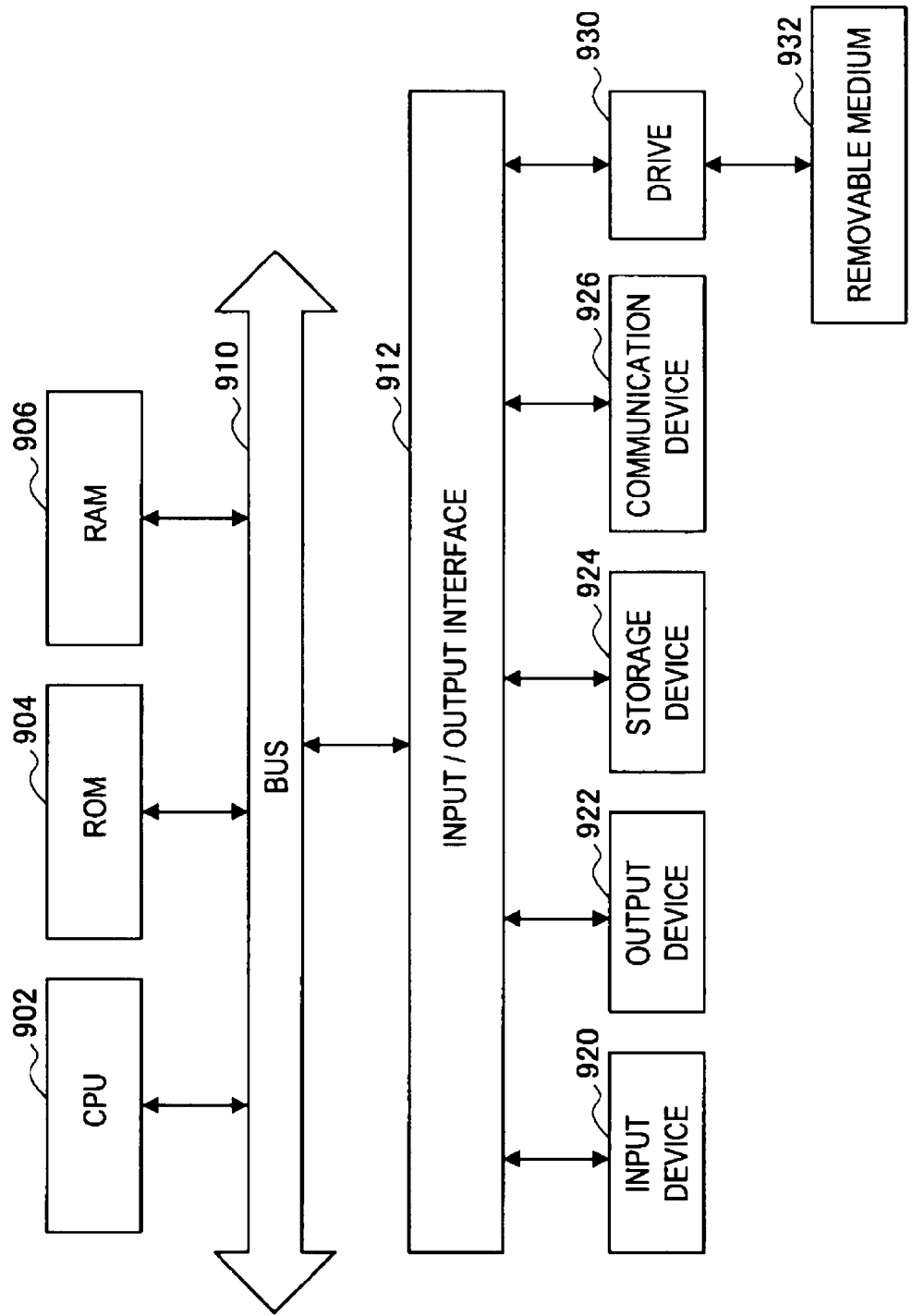
FIG. 21 is a block diagram showing an example of a configuration of a general-purpose computer.

Referring to FIG. 21, a CPU (Central Processing Unit) 902 controls the overall operation of the general-purpose computer. ROM (Read Only Memory) 904 stores a program describing a part or the whole of the series of processing or data. RAM (Random Access Memory) 906 temporarily stores a program, data or the like to be used by the CPU 902 during execution of processing.

The CPU 902, the ROM 904 and the RAM 906 are connected to one another through a bus 910. An input/output interface 912 is also connected to the bus 910. The input/output interface 912 is an interface for connecting the CPU 902, the ROM 904 and the RAM 906 with an input device 920, an output device 922, a storage device 924, a communication device 926 and a drive 930.

The input device 920 includes a device such as a button, a switch, a lever, a mouse or a keyboard, for example. The output device 922 includes a display device such as CRT, PDP, LCD or OLED and a sound output device such as a speaker, for example. The storage device 924 stores programs, program data and so on by using a recording medium such as a hard disk or semiconductor memory, for example. The communication device 926 performs communication processing through a network such as LAN or the Internet. The drive 930 is incorporated in the general-purpose computer according to need, and a removable medium 932, for example, is attached to the drive 930.

It should be understood by those skilled in the art that various modifications, combinations, sub-combinations and alterations may occur depending on design requirements and other factors insofar as they are within the scope of the appended claims or the equivalents thereof.

For example, the contents server 100 according to the first embodiment may deliver special sound interpreting a broadcasted game or the like, instead of delivering the user sound of other users, to the user terminal of a user located in the user position 14D (backstop seats) shown in FIG. 2.

Further, for example, the contents processing which is described with reference to FIG. 12 is not necessarily executed according to the sequence shown in the flowchart. Each processing step may include processing executed in parallel or individually.

The present application contains subject matter related to that disclosed in Japanese Priority Patent Application JP 2009-076970 filed in the Japan Patent Office on Mar. 26, 2009, the entire content of which is hereby incorporated by reference.

What is claimed is:

1. An information processing device comprising:
    a screen control unit that causes a user terminal to display a position selection screen including a plurality of user positions where a user can be located in a virtual space and that allows a user to select one user position from the plurality of user positions;
    a data storage unit that stores a user list of users that have selected user positions with respect to the plurality of user positions selected by the users using the position selection screen; and
    a contents processing unit that processes contents to be delivered to the user terminal according to a positional relationship between users represented by the user list stored in the data storage unit, the contents including a main video corresponding to the selected user position and a user video provided by another user terminal, wherein
    the contents processing unit synthesizes the main video and the user video, the size of the user video being changed based on the positional relationship between the user of the user terminal and the user of the other user terminal.

2. The information processing device according to claim 1, wherein
    the contents processing unit processes the contents to be delivered to the user terminal according to a predetermined distance in a virtual space with regard to the positional relationship between users.

3. The information processing device according to claim 2, wherein
    the positional relationship between users includes a positional relationship between different user positions and a positional relationship between users in one user position in the user list.

4. The information processing device according to claim 3, wherein
    the contents processing unit superimposes contents supplied from a user terminal of another user on contents to be delivered to a user terminal of one user by using a weight determined according to the distance in the virtual space.

5. The information processing device according to claim 4, wherein
    a value of the weight increases as the distance in the virtual space decreases.

6. The information processing device according to claim 1, further comprising:

a contents delivery unit that delivers first contents commonly delivered to a plurality of user terminals and second contents supplied from a user terminal of a second user located in the same user position as a first user to a user terminal of the first user.

7. The information processing device according to claim 6, wherein
the second user is a user adjacent to the first user in the user list.

8. The information processing device according to claim 6, wherein
the contents processing unit superimposes third contents supplied from a user terminal of a third user located in a different user position from the user position of the first user on the first contents.

9. The information processing device according to claim 1, wherein
the position selection screen is a screen that further displays a list of users located in each user position and allows a user to select one user position from the plurality of user positions by selecting any one of the displayed users.

10. The information processing device according to claim 9, wherein
the data storage unit arranges a user selected on the position selection screen and a user who has selected the user adjacent to each other in the user list.

11. The information processing device according to claim 1, wherein
the contents processing unit superimposes contents supplied from a user terminal of a friend user associated in advance with one user on contents to be delivered to a user terminal of the user.

12. A contents processing method, using an information processing device that stores a user list of users that have selected user positions with respect to a plurality of user positions where a user can be located in a virtual space in a recording medium, the method comprising the steps of:
displaying a position selection screen allowing a user to select one user position from the plurality of user positions on a user terminal;
updating the user list according to a selection result of a user position acquired through the position selection screen; and
processing contents to be delivered to the user terminal according to a positional relationship between users represented by the user list, the contents including a main video corresponding to the selected user position and a user video provided by another user terminal, wherein
the step of processing includes synthesizing the main video and the user video, the size of the user video being changed based on the positional relationship between the user of the user terminal and the user of the other user terminal.

13. A non-transitory computer-readable storage medium storing a program that causes a computer controlling an information processing device that stores a user list of users that have selected user positions with respect to a plurality of user positions where a user can be located in a virtual space in a recording medium to implement a method, the method comprising:
displaying a position selection screen allowing a user to select one user position from the plurality of user positions on a user terminal;
updating the user list according to a selection result of a user position acquired through the position selection screen;
processing contents to be delivered to the user terminal according to a positional relationship between users represented by the user list, the contents including a main video corresponding to the selected user position and a user video provided by another user terminal, wherein
the step of processing includes synthesizing the main video and the user video, the size of the user video being changed based on the positional relationship between the user of the user terminal and the user of the other user terminal.

* * * * *